(12) United States Patent
Vougioukas et al.

(10) Patent No.: US 10,705,848 B2
(45) Date of Patent: Jul. 7, 2020

(54) TAGE BRANCH PREDICTOR WITH PERCEPTRON PREDICTOR AS FALLBACK PREDICTOR

(71) Applicant: Arm Limited, Cambridge (GB)

(72) Inventors: Ilias Vougioukas, Cambridge (GB); Stephan Diestelhorst, Cambridge (GB); Andreas Lars Sandberg, Cambridge (GB); Nikos Nikoleris, London (GB)

(73) Assignee: Arm Limited, Cambridge (GB)

( * ) Notice: Subject to any disclaimer, the term of this patent is extended or adjusted under 35 U.S.C. 154(b) by 70 days.

(21) Appl. No.: 16/018,440

(22) Filed: Jun. 26, 2018

(65) Prior Publication Data

US 2019/0361707 A1    Nov. 28, 2019

(30) Foreign Application Priority Data

May 24, 2018  (GR) .............................. 20180100219

(51) Int. Cl.
*G06F 9/32* (2018.01)
*G06F 9/34* (2018.01)
*G06F 9/38* (2018.01)
*G06F 9/30* (2018.01)

(52) U.S. Cl.
CPC ........ *G06F 9/3844* (2013.01); *G06F 9/30058* (2013.01); *G06F 9/30145* (2013.01); *G06F 9/3806* (2013.01); *G06F 9/3859* (2013.01); *G06F 9/3861* (2013.01); *G06F 9/3846* (2013.01); *G06F 9/3848* (2013.01)

(58) Field of Classification Search
CPC .. G06F 9/3844; G06F 9/30058; G06F 9/3806; G06F 9/3861; G06F 9/3842; G06F 9/3846; G06F 9/3848; G06F 9/355; G06F 9/324; G06F 9/3557; G06F 9/30145; G06F 9/3859
USPC .................................................. 712/237–240
See application file for complete search history.

(56) References Cited

U.S. PATENT DOCUMENTS

| | | | | |
|---|---|---|---|---|
| 2016/0306632 | A1* | 10/2016 | Bouzguarrou | G06F 9/3848 |
| 2017/0322810 | A1* | 11/2017 | Navada | G06F 9/3001 |
| 2017/0344372 | A1* | 11/2017 | Levitan | G06F 1/3243 |
| 2017/0371670 | A1* | 12/2017 | Bonanno | G06F 9/3848 |

FOREIGN PATENT DOCUMENTS

GB         2539189         12/2016

OTHER PUBLICATIONS

Andre Seznec et al. "A New Case for the TAGE Branch Predictor" IEEE pp. 117-127, Dec. 2011. (Year: 2011).*
A. Seznec, "A 256 Kbits L-TAGE branch predictor" *Journal of Instruction-Level Parallelism (JILP) Special Issue: The Second Championship Branch Prediction Competition (CBP-2)*, May 2007, 6 pages.

(Continued)

*Primary Examiner* — Daniel H Pan
(74) *Attorney, Agent, or Firm* — Nixon & Vanderhye P.C.

(57) ABSTRACT

A TAGE branch predictor has, as its fallback predictor, a perceptron predictor. This provides a branch predictor which reduces the penalty of context switches and branch prediction state flushes.

17 Claims, 13 Drawing Sheets

(56) References Cited

OTHER PUBLICATIONS

A. Seznec, "Analysis of the O-GEometric History Length branch predictor" *32nd International Symposium on Computer Architecture (ISCA '05)*, Jun. 4-8, 2005, 12 pages.

L. Barroso et al, "Attack of the Killer Microseconds" *Communications of the ACM*, vol. 60, No. 4, Apr. 2017, pp. 48-54.

D. Evtyushkin et al, "BranchScope: A New Side-Channel Attack on Directional Branch Predictor" *ASPLOS '18*, Mar. 24-28, 2018, 15 pages.

A. Lukefahr et al, "Composite Cores: Pushing Heterogeneity into a Core" *MICRO 45 Proceedings of the 2012 45th Annual IEEE/ACM International Symposium on Microarchitecture*, Dec. 1-5, 2012, 12 pages.

M. Das et al, "An empirical study on performance of branch predictors with varying storage budgets" *2017 Seventh International Symposium on Embedded Computing and System Design (ISED)*, Dec. 18-20, 2017, 5 pages.

D.A. Jimenez et al, "Dynamic Branch Prediction with Perceptrons" Jun. 2, 2000, pp. 1-11.

S. Padmanabha et al, "DynaMOS: Dynamic Schedule Migration for Heterogeneous Cores" *MICRO-48*, Dec. 5-9, 2015, pp. 322-333.

A. Lukefahr et al, "Exploring Fine-Grained Heterogeneity with Composite Cores" manuscript, revised Jan. 13, 2015, 14 pages.

Y. Kim et al, "Flipping Bits in Memory Without Accessing Them: An Experimental Study of DRAM Disturbance Errors" *ISCA '14 Proceedings of the 41st Annual International Symposium on Computer Architecture*, Jun. 14-18, 2014, pp. 1-12.

S. Pasricha et al, "Improving Branch Prediction Accuracy in Embedded Processors in the Presence of Context Switches" *ICCD '03 Proceedings of the 21st International Conference on Computer Design*, Oct. 13-15, 2003, 6 pages.

M. Lipp et al, "Meltdown" *27th USENIX Security Symposium (USENIX'18)* Jan. 2018, pp. 1-16.

D. Tarjan et al, "Merging Path and Gshare Indexing in Perceptron Branch Prediction" *ACM Transactions on Architecture and Code Optimization*, vol. 2, No. 3, Sep. 2005, pp. 1-22.

D.A. Jimenez, "Multiperspective Perceptron Predictor with TAGE" 2016, pp. 1-5.

D.A. Jimenez, "Multiperspective Perceptron Predictor" *The Journal of Instruction-Level Parallelism*, 2016, pp. 1-5.

I. Vougioukas et al, "Nucleus: Finding the sharing limit of heterogeneous cores" *ACM Transactions on Embedded Computing Systems*, vol. 1, No. 1, Article 1, Oct. 2017, pp. 1-16.

E. Rotenberg et al, "Rationale for a 3D Heterogeneous Multi-core Processor" *2013 IEEE 31st International Conference on Computer Design (ICCD)*, Oct. 6-9, 2013, 15 pages.

A.S. Dhodapkar et al, "Saving and Restoring Implementation Contexts with co-Designed Virtual Machines" Jun. 2001, pp. 1-11.

P. Kocher et al, "Spectre Attacks: Exploiting Speculative Execution" Jan. 2018, pp. 1-16.

D. Tarjan et al, "Merging Path and Gshare Indexing in Perceptron Branch Prediction" *ACM Transactions on Architecture and Code Optimization*, vol. 2, No. 3, Sep. 2005, pp. 281-300.

A. Seznec, "TAGE-SC-L Branch Predictors" *JILP—Championship Branch Prediction*, Jun. 2014, 9 pages.

C. Fallin et al, "The Heterogeneous Block Architecture" *SAFARI Technical Report*, No. 2014-001, Mar. 13, 2014, pp. 1-15.

J. Dean et al, "The Tail at Scale" *Communications of the ACM*, vol. 56, No. 2, Feb. 2013, pp. 74-80.

T-Y. Yeh et al, "Two-Level Adaptive Training Branch Prediction" *MICRO 24 Proceedings of the 24th Annual International Symposium on Microarchitecture*, Sep. 1, 1991, pp. 51-61.

M. Evers et al, "Using Hybrid Branch Predictors to Improve Branch Prediction Accuracy in the Presence of Context Switches" *ISCA '96 Proceedings of the 23rd Annual International Symposium on Computer Architecture*, May 22-24, 1996, pp. 3-11.

C. Zhou et al, "Design Space Exploration of TAGE Branch Predictor with Ultra-Small RAM" *GLSVLSI'17*, May 10-12, 2017, pp. 281-286.

\* cited by examiner (a) Calibrating the number feature of tables for 1.25kB size.

(b) Diffferent sizes of perceptron with a constant of 8 feature tables.

TAGE BRANCH PREDICTOR WITH PERCEPTRON PREDICTOR AS FALLBACK PREDICTOR

This application claims priority to GR Patent Application NO. 20180100219 filed May 24, 2018, the entire contents of which are hereby incorporated by reference.

BACKGROUND

Technical Field

The present technique relates to the field of data processing. More particularly, it relates to branch prediction.

Technical Background

A data processing apparatus may have branch prediction circuitry for predicting outcomes of branch instructions before they are actually executed. By predicting branch outcomes before the branch instruction is actually executed, subsequent instructions following the branch can start to be fetched and speculatively executed before execution of the branch instruction is complete, so that if the prediction is correct then performance is saved because the subsequent instructions can be executed sooner than if they were only fetched once the outcome of the branch is actually known.

SUMMARY

At least some examples provide a TAGE branch predictor for predicting a branch instruction outcome, comprising: a plurality of TAGE prediction tables to provide a TAGE prediction for the branch instruction outcome, each TAGE prediction table comprising a plurality of prediction entries trained based on previous branch instruction outcomes; lookup circuitry to lookup each of the TAGE prediction tables based on an index determined as a function of a target instruction address and a portion of previous execution history indicative of execution behaviour preceding an instruction at the target instruction address, said portion of the previous execution history used to determine the index having different lengths for different TAGE prediction tables; and a fallback predictor to provide a fallback prediction for the branch instruction outcome in case the lookup misses in all of the TAGE prediction tables; in which: the fallback predictor comprises a perceptron predictor comprising at least one weight table to store weights trained based on previous branch instruction outcomes, and to predict the branch instruction outcome based on a sum of terms, each term depending on a respective weight selected from said at least one weight table based on a respective portion of at least one of the target instruction address and the previous branch history; and a total size of branch prediction state stored by the perceptron predictor is smaller than a total size of branch prediction state stored by the plurality of TAGE prediction tables.

At least some examples provide a TAGE branch predictor for predicting a branch instruction outcome, comprising: means for storing TAGE prediction tables to provide a TAGE prediction for the branch instruction outcome, each TAGE prediction table comprising a plurality of prediction entries trained based on previous branch instruction outcomes; means for looking up each of the TAGE prediction tables based on an index determined as a function of a target instruction address and a portion of previous execution history indicative of execution behaviour preceding an instruction at the target instruction address, said portion of the previous execution history used to determine the index having different lengths for different TAGE prediction tables; and means for providing a fallback prediction for the branch instruction outcome in case the lookup misses in all of the TAGE prediction tables; in which: the means for providing a fallback prediction comprises means for providing a perceptron prediction, comprising means for storing weights trained based on previous branch instruction outcomes, and means for predicting the branch instruction outcome based on a sum of terms, each term depending on a respective weight selected from said at least one weight table based on a respective portion of at least one of the target instruction address and the previous branch history; and a total size of branch prediction state stored by the means for providing a perceptron prediction is smaller than a total size of branch prediction state stored by the TAGE prediction tables.

At least some examples provide a method for predicting a branch instruction outcome using a TAGE branch predictor comprising a plurality of TAGE prediction tables for providing a TAGE prediction for the branch instruction outcome, each TAGE prediction table comprising a plurality of prediction entries trained based on previous branch instruction outcomes; the method comprising: looking up each of the TAGE prediction tables based on an index determined as a function of a target instruction address and a portion of previous execution history indicative of execution behaviour preceding an instruction at the target instruction address, said portion of the previous execution history used to determine the index having different lengths for different TAGE prediction tables; and providing a fallback prediction for the branch instruction outcome in case the lookup misses in all of the TAGE prediction tables, using a perceptron predictor comprising at least one weight table to store weights trained based on previous branch instruction outcomes, the fallback prediction being predicted based on a sum of terms, each term depending on a respective weight selected from said at least one weight table based on a respective portion of at least one of the target instruction address and the previous branch history; and a total size of branch prediction state stored by the perceptron predictor is smaller than a total size of branch prediction state stored by the plurality of TAGE prediction tables.

Further aspects, features and advantages of the present technique will be apparent from the following description of examples, which is to be read in conjunction with the accompanying drawings.

BRIEF DESCRIPTION OF THE DRAWINGS

Further aspects, features and advantages of the present technique will be apparent from the following description of examples, which is to be read in conjunction with the accompanying drawings, in which.

DESCRIPTION OF EXAMPLES

Figure 1:
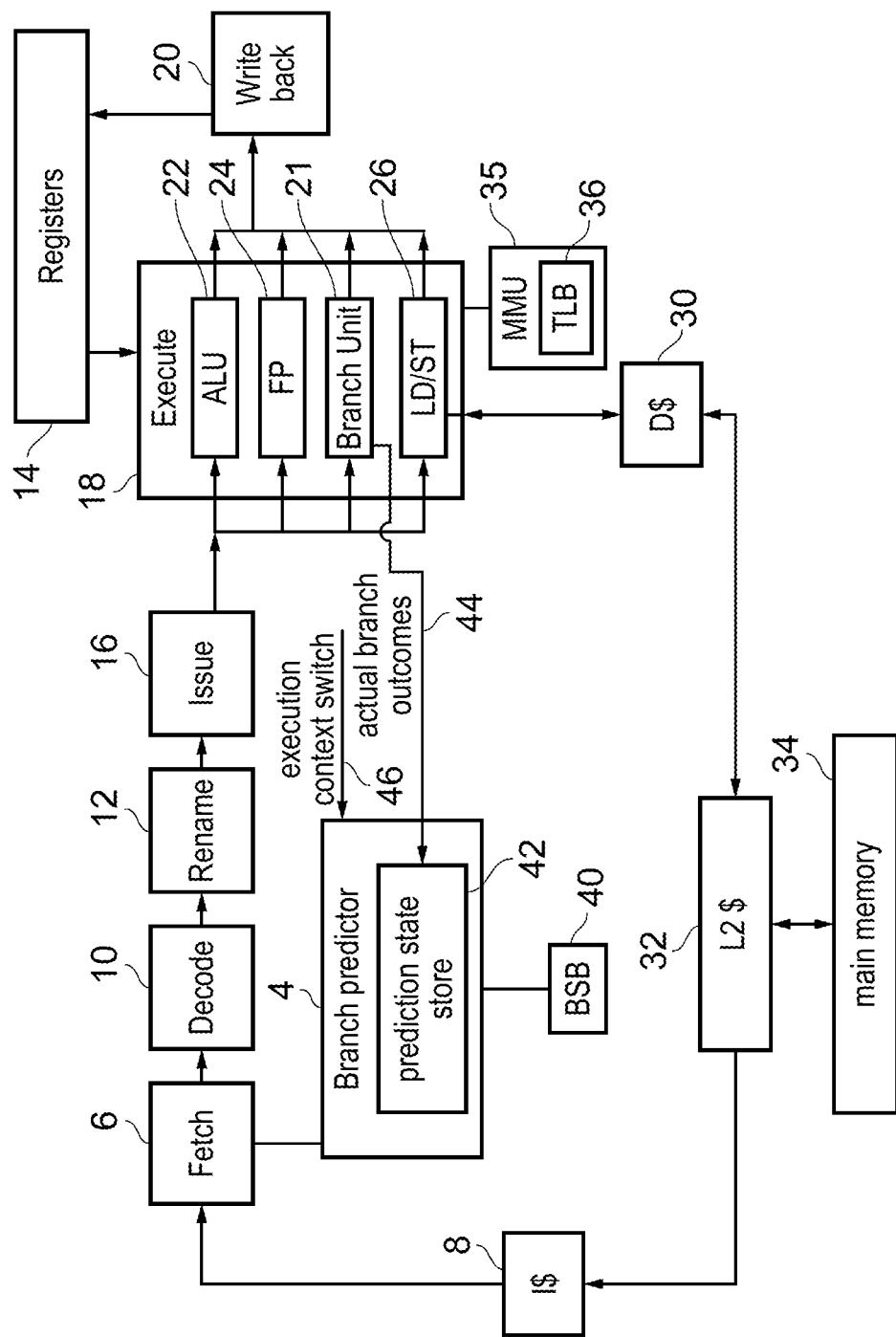
FIG. 1 schematically illustrates an example of a data processing apparatus having a branch predictor.

A TAGE (tagged geometric) branch predictor is a common form of branch predictor used for predicting branch instruction outcomes. A number of different variants of a TAGE branch predictor are available, but in general the TAGE branch predictor may have a number of TAGE prediction tables to provide a TAGE prediction for the branch instruction outcome, where each TAGE prediction table comprises a number of prediction entries trained based on previous branch instruction outcomes. The TAGE prediction tables are looked up based on index determined as a function of a target instruction address and a portion of previous execution history which is indicative of execution behaviour preceding instruction at the target instruction address. The portion of the previous execution history used to determine the index has different lengths for different TAGE prediction tables of the TAGE branch predictor. By tracking predictions for different lengths of previous execution history, this enables the TAGE branch predictor to be relatively accurate since when there is a match against a longer pattern of previous execution history then it is more likely that the predicted branch instruction outcome will be relevant to the current target instruction address, but nevertheless the TAGE branch predictor is also able to record predictions for shorter lengths of previous execution history in case there is no match against a longer length of previous execution history. Hence in general this could provide better branch prediction performance than alternative branch predictors which only match against a single length of previous execution history.

A TAGE branch predictor typically also includes a fallback predictor which provides a fallback prediction for the branch instruction outcome in case the lookup of the TAGE prediction tables misses in all of the TAGE prediction tables. In some examples, in addition to using the fallback prediction when the lookup misses, the fallback prediction could also be used if confidence in the prediction output by one of the TAGE prediction tables is less than a given threshold. In conventional TAGE branch predictors, the fallback predictor is implemented as a bimodal predictor, which provides a number of 2-bit confidence counters which track whether a branch should be strongly predicted taken, weakly predicted taken, weakly predicted not taken or strongly predicted not taken. Although the bimodal predictor is typically much less accurate than the TAGE prediction tables once the TAGE prediction tables have been suitably trained, providing the bimodal predictor as a fallback predictor to handle cases when the TAGE prediction tables have not yet reached a sufficient level of confidence can be useful to improve performance.

However, most existing branch predictor designs are designed to optimise performance in a steady state condition when the branch predictor is already fully warmed up, that is sufficient training of the prediction state based on previous branch instruction outcomes has already been performed in order to ensure that the predictors can be relatively accurate. However, the inventors recognised that, increasingly, context switches between different execution contexts are becoming much more frequent in typical processing systems, and so a greater fraction of the overall processing time is spent in a transient condition in which the branch predictor is still adapting to a new execution context following a recent context switch.

Also, recent papers have identified a class of security attack based on speculative side-channels, which in some variants can use training of the branch predictor based on a first execution context as a means to trick a second execution context into leaking sensitive information not accessible to the first execution context. This is because in some branch predictors it is possible that a branch prediction state entry allocated to the branch predictor based on observed branch history in one execution context could be accessed from a different software workload and used to predict the outcome of that different software context's branches. Previously, such use of branch prediction state from one context to predict outcomes of branches in another context would have been regarded as merely a performance issue, as if the second context hits against the wrong entry of the branch predictor allocated by a first context then any misprediction arising from this may be identified later and resolved once the actual branch outcome is known and this would have been expected merely to cause a delay in processing the correct branch outcome, but would not be expected to cause a security risk.

However, it has been recognised that instructions which are incorrectly speculatively executed due to a mispredicted branch may still influence data in a cache or another non-architectural storage structure used by a data processing apparatus. This could be exploited by an attacker to attempt to gain some information on potentially sensitive data which is not accessible to the attacker but is accessible to another execution context which can be tricked by the attacker into executing instructions designed to access the secret and cause changes in cache allocation which expose some information about the secret to the attacker. For example the attacker could train the branch predictor with a pattern of branch accesses, so that when the victim execution context later accesses the same entry then it will incorrectly execute an instruction from a wrong target address or follow a wrong prediction of whether a branch is taken or not taken, causing an inappropriate access to the secret information. Cache timing side channels can then be used to probe the effects of the incorrect speculation to leak information about the secret.

A possible mitigation against such attacks can be to flush the branch prediction state when encountering a context switch so that the incoming execution context cannot make use of previously trained branch prediction state derived from the outgoing execution context. However, in this case the transient behaviour of the branch predictor when the branch prediction state has just been flushed may become more significant than the steady state behaviour.

In the techniques discussed below, a TAGE branch predictor is provided in which the fallback predictor comprises a perceptron predictor. The perceptron predictor comprises at least one weight table to store weights trained based on previous branch instruction outcomes. The perceptron predictor predicts the branch instruction outcome based on a sum of terms, each term depending on a respective weight selected from the at least one weight table based on a respective portion of at least one of the target instruction address and the previous branch history. A perceptron predictor would normally be regarded as a completely different type of branch predictor to the TAGE branch predictor, which could be used in its own right to provide a complete prediction of a branch instruction outcome. It would not normally be used as the fallback predictor in a TAGE branch predictor. However, the inventors have recognised that by using a perceptron predictor as the fallback predictor of a TAGE branch predictor, this can provide a branch predictor which learns faster in the transient state shortly after a context switch, and reduces the penalty of context switches and branch prediction state flushes, to improve performance and provide a branch predictor which can cope better with the demands placed on branch predictors in modern processing systems. Also, the perceptron predictor can provide better prediction accuracy per byte of data stored, which makes it more suitable in systems having a limited area budget.

Selection circuitry may be provided to select between the fallback prediction provided by the fallback predictor and the TAGE prediction provided by the TAGE prediction tables depending on a confidence value which indicates a level of confidence in the TAGE prediction. The confidence value may be obtained from the TAGE prediction tables by the lookup circuitry which performs the lookup on the TAGE prediction tables. That is, each prediction entry of the TAGE prediction tables may specify, not only a prediction of taken or not taken, but also may specify a level of confidence in that prediction being correct (the same counter may indicate both the predicted outcome and the confidence). The confidence indications from the TAGE prediction tables themselves therefore influence whether the fallback prediction from the perceptron or the TAGE prediction based on the TAGE prediction tables are used. In some examples, the perceptron predictor may also generate a confidence indication (e.g. the value before applying a threshold function) that could also be factored into the decision on which of the fallback and TAGE predictions to select.

The selection circuitry may select the fallback prediction when the lookup misses in all of the TAGE prediction tables or when the confidence value associated with the TAGE prediction indicates a level of confidence less than a threshold. In some cases these events may be compared in a single comparison, since the case when the lookup misses in all of the TAGE prediction tables may be treated as if the confidence value is 0. Hence, while the main TAGE prediction may be preferentially selected in most cases, the fallback predictor provides a backup option in case the main TAGE prediction is inappropriate.

If the lookup hits in at least one TAGE prediction table, the TAGE prediction may comprise a prediction based on an indexed entry of a selected TAGE prediction table, where the selected TAGE prediction table is the prediction table for which the index is determined based on the longest portion of the previous branch history among those TAGE prediction tables which were hit in the lookup. Hence, if there is a hit in a first TAGE prediction table corresponding to an index derived from a first length of execution history and a second prediction table accessed based on an index derived from a second length of previous execution history that is longer than the first length, then the table corresponding to the index derived from the second length of execution history would be used to provide the TAGE prediction.

A total size of branch prediction state stored by the perceptron predictor is smaller than a total size of branch prediction state stored by the plurality of TAGE prediction tables. Hence, as the perceptron predictor is being used as the fallback predictor which provides a fallback in case the TAGE prediction tables cannot provide an appropriate level of confidence in the prediction, then it is not worth incurring a greater area/power cost in providing a particularly large perceptron predictor. A relatively small perceptron predictor can be sufficient to provide a relatively significant performance boost in the transient operating state as discussed above. Providing a relatively small perceptron predictor can also reduce branch prediction state saving and restoring overhead as discussed below.

The TAGE branch predictor may have control circuitry which is responsive to an execution context switch of a processing element from a first execution context to a second execution context, to prevent the TAGE branch predictor providing a branch prediction for an instruction of the second execution context based on branch prediction state trained based on instructions of the first execution context. This can mitigate against speculative side-channel attacks of the form discussed above.

The TAGE branch predictor may have branch prediction save circuitry responsive to a branch prediction save event to save information to a branch state buffer depending on at least a portion of the at least one weight table of the perceptron predictor, and branch prediction restore circuitry responsive to a branch prediction restore event associated with a given execution context to restore at least a portion of the at least one weight table of the perceptron predictor based on information previously stored to the branch state buffer. By saving active state to the branch state buffer and then later restoring it back to the perceptron predictor, this can ensure that even if the active state is flushed from the perceptron predictor on an execution context switch as discussed above to mitigate against speculation side-channel attacks, on returning to a given execution context some branch predictor state can be restored for that context, to reduce the performance loss incurred by preventing instructions from one execution context using prediction state trained in another execution context. Effectively the saving and restoring functions enable the incoming context following execution context to start from a partially warmed state of the branch predictor.

It has been found that saving the entire set of branch prediction state across the TAGE branch predictor as a whole (including the TAGE prediction tables) to the branch state buffer may require a relatively large volume of storage in the branch state buffer, which may be unacceptable for some area-constrains processor designs. In practice, the perceptron predictor provided as a fallback predictor can provide a greater level of performance boost per unit of data stored, and so by saving at least a portion of the state of the perceptron predictor to the branch state buffer in response to the branch prediction save event (but not saving state from the TAGE prediction tables), this can reduce the amount of storage capacity required for the branch state buffer, to limit the area cost while still providing a reasonable level of performance in the transient operating state following a context switch as discussed above.

In a system which supports saving and restoring of state from the perceptron predictor, some examples may apply compression and decompression to the saving and restoring respectively, so that it is not necessary to save the weight tables (or any other perceptron predictor state) in the state buffer in exactly the same form as which they are stored within the perceptron predictor itself.

The branch prediction save event associated with the given execution context could comprise any one or more of:
the execution context switch, for which said given execution context is the first execution context;
migration of the given execution context from the processing element to another processing element;
elapse of a predetermined period since a preceding branch prediction save event;
detecting or executing a branch prediction save instruction within the given execution context; and
an update of the active branch prediction state meeting a predetermined condition which occurs during execution of the given execution context.

Hence, in some cases the prediction state may be saved to the branch state buffer in response to the execution context switch itself, or in response to the migration of a context from the processing element to another processing element. However, it may also be possible to save active branch prediction state associated with a given execution context to the branch state buffer at intervals during processing of the given execution context, so that less state saving needs to be done at the time of the execution context switch, which can improve performance. For example, state could be saved to the branch state buffer periodically or in response to an update to the active branch prediction state that meets some predetermined condition (e.g. a change that leads to greater than a threshold level of confidence. Also, in some cases a branch prediction save instruction may be defined which when included within the software of the given execution context may trigger the branch prediction save circuitry to save the currently active branch prediction state (with compression if necessary) to the branch state buffer.

Similarly, the branch prediction restore event associated with a given execution context may comprise any one or more of:
the execution context switch, for which the given execution context is the second execution context;
migration of the given execution context from another processing element to the processing element associated with the branch predictor for which state is restored;
elapse of a predetermined period since a preceding branch prediction restore event; and
detecting or executing a branch prediction restore instruction within the given execution context.

The execution contexts may for example be different processes executed by the processing element (where each process may for example be a given application, operating system or hypervisor executing on the processing element). In some cases, different sub-portions of a given process could be considered to map to different execution contexts. For example, different address ranges within a given program could be mapped to different execution contexts, or execution context dividing instructions included in the software code could be considered to mark the points at which there is a switch from one execution context to another. In other examples a group of software processes executed by the processing element could all be considered to be part of a single execution context. Also, in some cases respective threads executed by the processing circuitry which correspond to the same process, or a sub-group of threads among multiple threads, could be considered to be one execution context. Hence, it will be appreciated that the precise manner in which a number of software workloads can be divided into execution contexts may vary from implementation to implementation.

In cases where saving and restoring of perceptron predictor states is being used, then during an initial period following the branch prediction restore event, there may be a phase when, although the perceptron predictor has been warmed up by the restored branch prediction state, the TAGE prediction tables may still provide relatively low confidence predictions as they may previously have been disabled or flushed. Hence, during an initial period following the branch prediction restore event, the selection circuitry for selecting between the TAGE prediction and the fallback prediction may be configured to select the fallback prediction that is provided by the fallback predictor. During this initial period, the TAGE prediction tables may still be updated based on outcomes of branch instructions, even though those entries are not currently being used to actually predict the branch instruction outcomes. Hence, gradually during the initial period the confidence in the TAGE prediction can increase as the TAGE prediction tables are trained based on the actual branch outcomes. In some examples the initial period may correspond to a fixed duration irrespective of the level of confidence reached by the TAGE predictions. For example the initial period could be one of: a predetermined duration of time following the branch prediction restore event; a predetermined number of processing cycles following the branch prediction restore event; a predetermined number of instructions being processed following the branch prediction restore event; a predetermined number of branch instructions being processed following the branch prediction restore event; or a predetermined number of lookups being made by the lookup circuitry following the branch prediction restore event. Alternatively, the length of the initial period could vary based on the level of confidence reached by the TAGE prediction. The initial period may end once a level of confidence in the TAGE prediction has exceeded a predetermined level.

The TAGE branch predictor discussed above (including the main TAGE prediction tables and the perceptron predictor provided as a fallback predictor for the TAGE branch predictor) may be used to predict outcomes of branch instructions processed by a first processing element within a data processing apparatus.

In some examples the apparatus may also have a second processing element which has a second branch predictor for predicting outcomes of branch instructions processed by the second processing element. This second branch predictor could have a different design to the TAGE branch predictor used by the first processing element. For example, in an apparatus which provides heterogeneous processor cores with different levels of performance and energy efficiency, a more energy efficient (but less powerful) processing element may use a simpler form of branch predictor than the TAGE branch predictor used by a more performance-orientated, but less energy efficient, processing element.

In some examples, the second branch predictor may comprise a perceptron predictor which corresponds in design to the fallback predictor of the TAGE branch predictor. For example the second branch predictor could have exactly the same configuration of weight tables (same number of tables and same size of tables) as the fallback predictor of the TAGE branch predictor that is used by the first processing element. This can make migration of execution context between the first and second processing elements much more straightforward as it is possible to simply copy all the perceptron state (including the weight tables) when migrating an execution context between the first processing element to the second processing element, which can reduce the performance impact of migrating the context. When migrating an execution context from the second processing element to the first processing element, then while the at least one weight table may be transferred from the second branch predictor to the fallback predictor of the first branch predictor, the TAGE prediction tables may be initialised to initial values which are independent of the state of the second branch predictor. This may be similar to the case when, following a state restore event, the TAGE branch predictor is initialised to default values as its state has not saved to the branch state buffer. On the other hand, when an execution context is migrated from the first processing element to the second processing element, then while the at least one weight table may be transferred from the fallback predictor (perceptron predictor) of the first TAGE branch predictor to the second branch predictor, the TAGE prediction tables of the TAGE branch predictor may be invalidated or disabled.

FIG. 1 schematically illustrates an example of a data processing apparatus 2 having a processing pipeline comprising a number of pipeline stages. The pipeline includes a branch predictor 4 for predicting outcomes of branch instructions and generating a series of fetch addresses of instructions to be fetched. A fetch stage 6 fetches the instructions identified by the fetch addresses from an instruction cache 8. A decode stage 10 decodes the fetched instructions to generate control information for controlling the subsequent stages of the pipeline. A rename stage 12 performs register renaming to map architectural register specifiers identified by the instructions to physical register specifiers identifying registers 14 provided in hardware. Register renaming can be useful for supporting out-of-order execution as this can allow hazards between instructions specifying the same architectural register to be eliminated by mapping them to different physical registers in the hardware register file, to increase the likelihood that the instructions can be executed in a different order from their program order in which they were fetched from the cache 8, which can improve performance by allowing a later instruction to execute while an earlier instruction is waiting for an operand to become available. The ability to map architectural registers to different physical registers can also facilitate the rolling back of architectural state in the event of a branch misprediction. An issue stage 16 queues instructions awaiting execution until the required operands for processing those instructions are available in the registers 14. An execute stage 18 executes the instructions to carry out corresponding processing operations. A writeback stage 20 writes results of the executed instructions back to the registers 14.

The execute stage 18 may include a number of execution units such as a branch unit 21 for evaluating whether branch instructions have been correctly predicted, an ALU (arithmetic logic unit) 22 for performing arithmetic or logical operations, a floating-point unit 24 for performing operations using floating-point operands and a load/store unit 26 for performing load operations to load data from a memory system to the registers 14 or store operations to store data from the registers 14 to the memory system. In this example the memory system includes a level one instruction cache 8, a level one data cache 30, a level two cache 32 which is shared between data and instructions, and main memory 34, but it will be appreciated that this is just one example of a possible memory hierarchy and other implementations can have further levels of cache or a different arrangement. Access to memory may be controlled using a memory management unit (MMU) 35 for controlling address translation and/or memory protection. The load/store unit 26 may use a translation lookaside buffer (TLB) 36 of the MMU 35 to map virtual addresses generated by the pipeline to physical addresses identifying locations within the memory system. It will be appreciated that the pipeline shown in FIG. 1 is just one example and other examples may have different sets of pipeline stages or execution units. For example, an in-order processor may not have a rename stage 12.

The branch predictor 4 may include structures for predicting various outcomes of branch instructions. For example the branch predictor 4 may include a branch direction predictor which predicts whether conditional branches should be taken or not taken. Another aspect of branch outcomes that can be predicted may be the target address of a branch. For example, some branch instructions calculate the target address indirectly based on values stored in the registers 14 and so can branch to addresses which are not deterministically known from the program code itself. The branch target buffer (BTB) (also known as branch target address cache (BTAC)) may be a portion of the branch predictor 4 which has a number of entries each providing a prediction of the target address of any branches occurring within a given block of instructions. Optionally the BTB or BTAC may also provide other information about branches, such as prediction of the specific type of branch (e.g., function call, function return, etc.). Again, predictions made by the BTB/BTAC may be refined based on the actual branch outcomes 44 determined for executed branch instructions by the branch unit 21 of the execute stage.

The processing pipeline shown in FIG. 1 may support execution of a number of different software workloads (execution contexts). The software workloads could include different processes executing according to different program code, or could include multiple threads corresponding to the same process. Also, in some cases different portions within a process could be regarded as different workloads, for example certain address ranges within the process could be marked as a separate workload.

When different processes execute on the same pipeline, typically the branch predictor 4 has been shared between those processes. As different processes may have different branch behaviour at the same instruction address, this can mean that looking up the branch predictor structures for a given instruction address could provide predicted behaviour which may not be relevant to one process because it has been trained based on another process. Typically, branch mispredictions caused by one process accessing a branch prediction entry that was trained by another process would have been regarded as merely an issue affecting performance rather than affecting security, since if the prediction is incorrect then this will be detected when the branch is actually executed in the branch unit 21 and then the branch unit can trigger the pipeline to be flushed of subsequent instructions fetched incorrectly based on the misprediction, and the processor state can be rewound to the last correct state resulting from the last correctly predicted instruction.

However, while the architectural effects of a misprediction may be reversed, the misprediction may cause longer lasting effects on micro-architectural state such as the data cache 30 or TLB 36. It has recently been recognised that it is possible for an attacker to exploit the branch predictor 4 to gain access to secret information that the attacker should not have access to. The memory management unit 35 may apply a privilege scheme so that only processes executed at certain privilege levels are allowed to access certain regions of memory. For example, some secret data may be inaccessible to the attacker's process (e.g. because the attacker's process runs at a lowest privilege level), but may be accessible to a process operating at a higher privilege level such as an operating system or hypervisor. The secret data can be any data which is considered sensitive, such as a password, personal financial details etc. The attack may be based on training the branch predictor 4 so that a branch within the victim code executed at a more privileged state of the processor branches to some gadget code which the more privileged victim code is not intended to execute but executes incorrectly because of a branch misprediction in a branch of the victim code which is unrelated to the secret. The gadget code may be designed by the attacker to access a memory address which is computed based on the secret data, so that data (or other information such as TLB entries) associated with a memory address which depends on the secret data is loaded into one of the caches 30, 32, 36, 42 of the data processing system. Which address has been loaded can then be deduced through cache timing analysis and this can allow information to be deduced about the secret.

One possible mitigation for these types of attacks may be to flush the branch prediction state from the branch predictor each time an execution context switch occurs, but this approach may be expensive, because each time a given process returns for another slot of execution then it may have to derive its branch prediction state from scratch again which may cause many additional mispredictions impacting on performance.

As shown in FIG. 1, the overhead of mitigating against the attacks discussed above can be reduced by providing the branch predictor 4 with a branch state buffer (BSB) 40 to which branch prediction state can be saved from the main prediction state store 42 (used by the branch predictor 4 to store the active state used to generate actual branch predictions), and from which previously saved state can be restored to the prediction state store 42. The active branch prediction state in the prediction state store 42 is trained based on actual branch outcomes 44 determined by the branch unit 21. In response to various state saving or restoring events, state can be saved from the prediction state store 42 to the BSB 40 or restored from the BSB 40 to the prediction state store 42. The BSB 40 may tag saved portions of state with an identifier of the execution context associated with that state so that, on a restore event associated with a given execution context, the state that is relevant to that context is restored, to avoid one execution context making predictions based on state trained by another execution context. On an execution context switch indicated by signal 46, the active prediction state in the prediction state 42 associated with the outgoing execution context can be flushed, invalidated or disabled in some way to prevent it being used to make predictions for the incoming context, and the restoration of state from the BSB 40 can be used to reduce the performance impact of this flushing.

Figure 2:
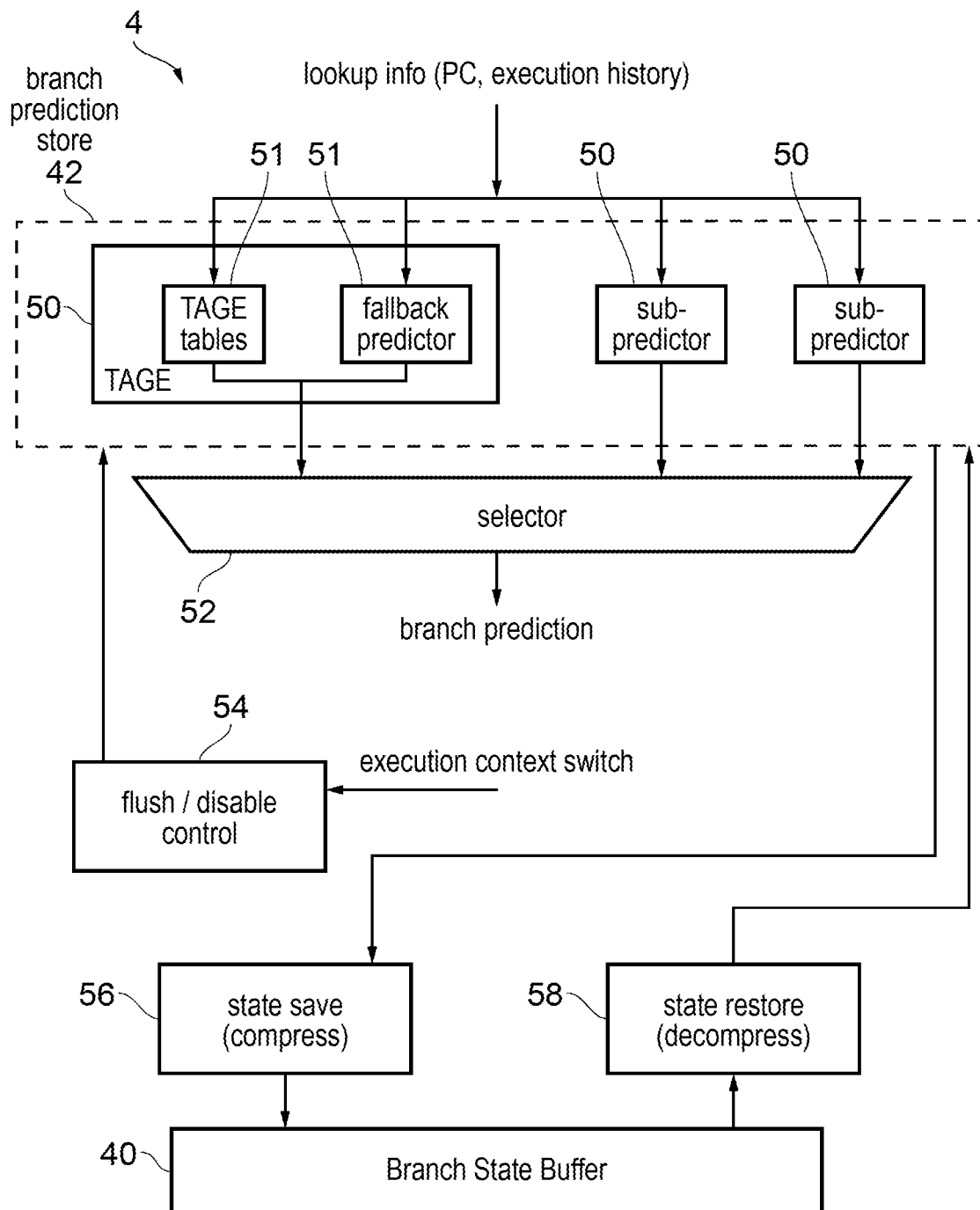
FIG. 2 schematically illustrates providing a branch state buffer for saving and restoring of branch prediction state in the branch predictor.

FIG. 2 shows an example of the branch predictor 4 in more detail. The example of FIG. 2 is applied to a branch direction predictor for predicting whether the branches are taken or not taken, but it will be appreciated that similar techniques could also be used for a branch target address cache or BTB. The branch predictor 4 may include a number of predictor units 50, 51 which provide different predictions, based on different prediction methods. For example, the predictor units may include a main predictor (for example a TAGE predictor 50), as well additional sub-predictors 50 which may provide predictions for specific scenarios, such as detecting branches involved in loops. The TAGE predictor 50 may itself comprise multiple prediction units 51, such as the tagged geometric history (TAGE) tables used to generate a main prediction and a fallback predictor (also referred to below as a base predictor) used to provide a fallback prediction in case the TAGE tables cannot provide a suitable prediction. The fallback predictor could be a bimodal predictor or perceptron predictor as discussed below. In general, each of the predictor units 50, 51 is looked up based on lookup information which is derived as a function of the program counter (PC) which represents a target instruction address for which a prediction is required, and/or previous execution history which represents a history of execution behaviour leading up to the instruction associated with the program counter address. For example the execution history could include a sequence of taken/not taken indications for a number of branches leading up to the instruction represented by the program counter, or portions of one or more previously executed instruction addresses, or could represent a call stack history representing a sequence of function calls which led to the instruction represented by the program counter. The execution history could also include an indication of how long ago the branch was encountered previously (e.g. number of intervening instructions or intervening branch instructions). By considering some aspects of history leading up to a given program counter address in addition to the address itself, this can provide a more accurate prediction for branches which may have different behaviour depending on the previous execution sequence. Different predictor units 50, 51 may consider different portions of the lookup information in determining the prediction. A selector 52 may then select between the alternative predictions provided by each predictor unit, depending on a level of confidence in these predictions and/or other factors. For example, the fallback predictor could be selected in cases where the main TAGE predictor cannot provide a prediction of sufficiently high confidence.

Each of the predictor units 50, 51 may store some prediction state which can be used to make predictions for the particular branch context represented by the lookup information. For example, each predictor unit may comprise a table which is indexed based on a function of portions of the lookup information. The function used to derive the index may differ for the respective predictor units 50, 51. The entire set of branch prediction state stored across each of the predictor units 50, 51 may collectively be regarded as the branch prediction store 42 of the branch predictor 4. It will be appreciated that the selector shown in FIG. 2 is simplified and in practice it may consider a number of factors in determining which predictor unit to use as the basis for the actual output branch prediction.

As shown in FIG. 2, flush/disable control circuitry 54 may be provided to control the various branch prediction units 50, 51 to flush or disable portions of active branch predictor state when an execution context switch is detected. The context switch could be detected based on a variety of signals within the processor pipeline shown in FIG. 1. When the processing switches between execution contexts then a signal 46 is provided to the branch predictor 4 by any element of the pipeline which is capable of detecting the context switch. For example the fetch stage 6 could recognise that instruction fetch addresses have reached a program instruction address which marks the boundary between different contexts, or the decode stage 10 could detect that a context dividing instruction has been encountered and inform the branch predictor of the context switch. Also, the execute stage 18 could mark the context switch when detected and signal this to the branch predictor 4. Also in some cases the context switch may be triggered by an interrupt or exception and in this case the switching signal 46 may be signalled by an interrupt controller. Regardless of the source of the switching signal 46, in response to the switching signal 46 the branch prediction store 42 may invalidate entries. Hence, this prevents any contents of the predictor units 50 which were trained in a previously executed context from being used for the new context after the execution context switch.

Either in response to the execution context switch itself, or at intervals during the running of a given execution context, state saving circuitry 56 may compress at least a portion of the branch prediction state stored in the branch prediction store 42 and allocate the compressed state to the branch state buffer 40. In response to a state restore event, previously saved branch prediction state may be decompressed from the branch state buffer and restored in the branch prediction store 42 by state restore circuitry 58. The state save and restore events, could be triggered by a range of events such as the execution of particular instructions used to trigger state saving or restoring for the branch predictor, the elapse of a given amount of time or a certain number of processing cycles since the state was last saved or restored, or a particular update of the branch prediction state being made which meets a condition (such as reaching at a given level of confidence) such that it is desired to save a portion of that branch prediction state to the branch state buffer 40 to enable it to be restored later if necessary when the same execution context is executed once more. This can help to improve performance by reducing the cost of flushing when an execution context switch is encountered.

Figure 3:
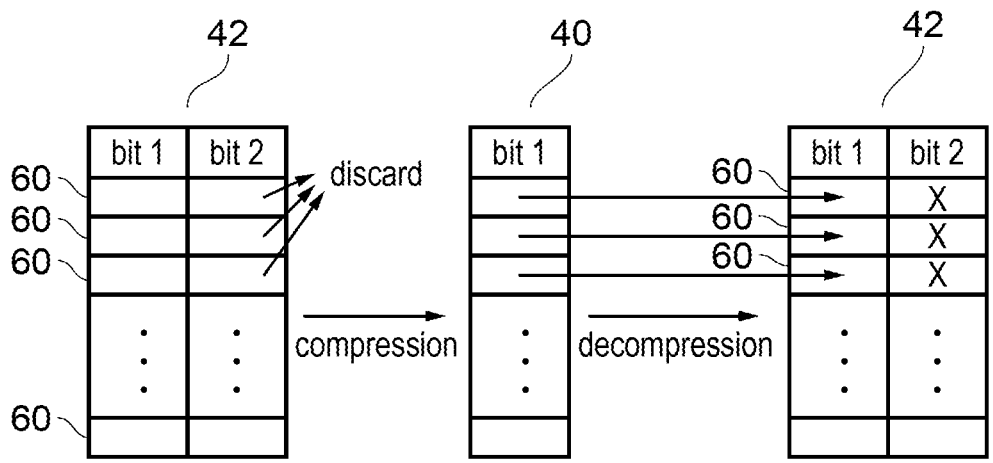
FIGS. 3 to 6 illustrate a number of examples of compression and decompression of branch prediction state.

FIGS. 3 to 6 show a number of ways of performing the compression upon state saving and decompression upon state restoration. For example, FIG. 3 shows how a horizontal compression can be applied to a number of branch prediction entries 60 in a given one of the branch predictor units 50, 51. In this example the branch prediction entries 60 are shown as bimodal predictor entries which provide 2-bit confidence counters for tracking taken/not taken confidence. Bit 1 of the 2 bit counter may for example indicate whether the outcome should be predicted as taken or not taken and bit 2 may indicate whether the strength of the confidence in that taken or not taken prediction should be interpreted as strongly predicted or weakly predicted (e.g. 11 could indicate strongly taken, 10 weakly taken, 01 weakly not taken, and 00 strongly not taken). In one example, the state saving circuitry 56 may apply a compression so that one of the bits of each counter is discarded, so as to compress the prediction state value of a given entry 60 into a compressed value having fewer bits.

While FIG. 3 shows an example where the horizontal compression is applied to a bimodal predictor entry, it could also be applied to other types of branch prediction entry. For example in a perceptron predictor, at least one table of weights may be provided, and in the compression the number of bits to represent the weight could be reduced from a larger number to a smaller number so as to reduce the resolution with which the weights are represented. When restoring compressed state previously saved to the branch state buffer 40, a decompression may be applied where the restored value is selected as a function of the compressed value. For example, those bits that were not discarded during the compression may be restored based on the values stored in the value state buffer 40, and any other bits of each branch prediction entry which were discarded during the compression may be set to some value X which may be determined based on the compressed data or could be set to a default value. For example, with a bimodal predictor the default could be that bit 2 is set to whatever value indicates that the taken/not taken prediction indicated by bit 1 is strongly predicted (e.g. with the encoding above, bit 2 could be set to the same value as bit 1). Other approaches could instead initialise each entry as weakly predicted (e.g. setting bit 2 to the inverse of bit 1). Another approach could set the same value (either 1 or 0) for bit 2 in all entries regardless of what prediction was indicated by bit 1. Hence, although the compression and the decompression may result in the restored prediction state not indicating the same level of confidence as was present before the state data was compressed, this may enable the storage capacity of the overall state buffer 40 to be reduced and hence the overhead of implementing the saving and restoring to be reduced while still performing a performance boost relative to the case where no state was saved at all.

Figure 4:
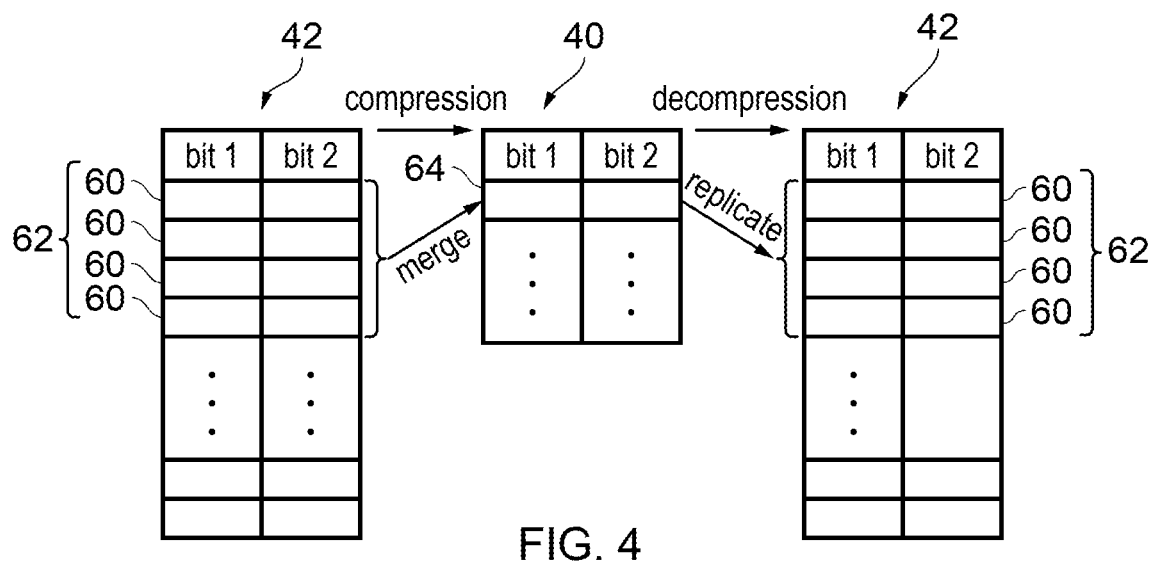

As shown in FIG. 4 another example of compression may be to apply a vertical compression so as to reduce the number of entries which are saved in the branch state buffer compared to the number of branch prediction entries 60 which were provided in the original prediction state store 42. Again, FIG. 4 shows an example for a bimodal predictor but it will be appreciated that similar techniques could also be applied to tables providing other types of branch prediction state. In this case, the compression may merge a group of entries 62 into a single entry 64 in the compressed branch prediction state. For example, the merging could be performed by selecting the branch prediction value stored in a selected one of the group of entries 62, and recording that value as the merged entry 64. A more sophisticated approach could be to check the values of each of the group of entries and determine what the most common value represented by those entries of the group is (e.g. by majority voting), and then set the merged entry 64 to the value taken by the majority of the individual entries 60 in the group 62. On decompressing the state saved in the branch state buffer 40, then each of the individual entries 60 in the same group 62 could be set to the same value as indicated by the merged entry 64 of the compressed state. Again, while this may introduce some level of inaccuracy relative to the original state, this still enables improved performance compared to the case where no state was saved at all. This approach recognises that often the branch behaviour may be relatively similar for a number of entries and so the performance loss associated with not representing each of those entries within the branch state buffer may be relatively insignificant. While FIG. 4 shows an example where four neighbouring entries 60 of the table 42 are merged into a single merged entry 64, this is not essential and the group of entries merged into a single compressed entry could be at non-contiguously located positions within the table. This can be advantageous because it is common in branch predictors for the hashing algorithm used to derive the index into the table to map nearby branch addresses into quite distinct regions of the table to reduce hotspots and so the branches which may be expected to have similar behaviour could be represented by entries at non-adjacent locations in the table.

Figure 5:
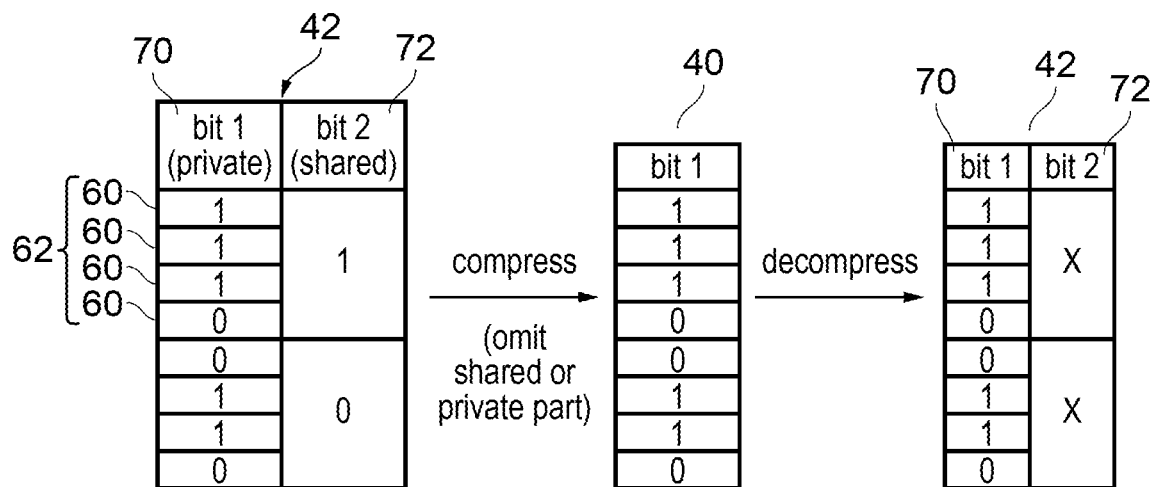

FIG. 5 shows another example of compression and decompression. In some branch predictor units, it is possible for each branch prediction entry 60 to provide a branch prediction state value which includes a private part 70 which is specified separately for each entry and a shared part 72 which is specified once for a whole group of entries 62 so as to be shared between the group. This can reduce the overhead of the main prediction store 42. Again, FIG. 5 shows an example applied to a bimodal predictor, but in a similar way weights within a weight table of a perceptron predictor for example could include such private and shared parts. In this case, the compression could include omitting the shared part 72 from the compressed state as shown in the case of FIG. 5. Upon decompression, the shared part could be set to some default value X (0 or 1) or to a value selected based on a function of the private part reconstructed by the compressed state. It would also be possible, instead of omitting shared part, to retain only the shared part and omit the private part 70.

Figure 6:
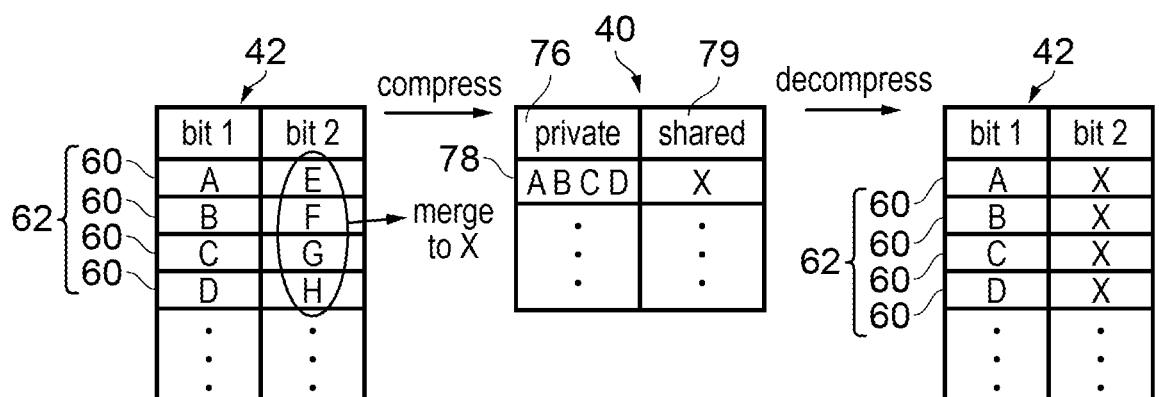

Also, as shown in FIG. 6, the compression could introduce such sharing of part of a prediction value between entries corresponding to separate index values, which could then be removed again upon such compression. For example, in FIG. 6 a group of entries 62 includes separate values for both bit 1 and bit 2 of bimodal counter, but upon compression to generate the state saved to the BSB 40, while bit 1 is represented separately for each of the entries in a private portion 76 of a given entry 78 of the compressed state, the second bit of each entry 60 in the group 62 is merged to form a single value X represented as the shared part 79 of the compressed branch prediction state 78. For example the shared value X could be set to any one of the values E to H of bit 2 in the group of entries 62 of the original state, or could be set to the value taken by the majority of the second bit E to H in that group 62. Upon decompression the shared value 79 could simply be copied to the corresponding portion of each entry 60 in the group 62 when the active state is restored based on the compressed state stored in the BSB 40. Again while FIG. 6 applies to a bimodal predictor a similar approach can also be applied to other forms of table providing different types of branch prediction state.

Hence, in general by applying compression and decompression upon saving and restoring state this can reduce the overhead greatly to make such saving and restoring more practical. Another approach for compression and decompression can be to omit the state for a given prediction unit 50 from the compressed state saved to the branch state buffer 40. For example the saving and restoring can be applied only to the state associated with the fallback predictor, and the state associated with other predictors could simply be flushed or disabled on a context switch without any state saving or restoring being applied. This recognises that the fallback predictor 50 may often provide the greatest level of performance boost per bit of information stored as the branch prediction state, as demonstrated in the graphs discussed below.

In examples which apply compression and decompression which result in a transformation format in which entries 60 of branch prediction state are represented, it may be preferable to provide a physically distinct branch state buffer 40, separate from the branch prediction store 42 which provides the active branch prediction state, so that the BSB can be smaller than the branch prediction store.

Figure 7:
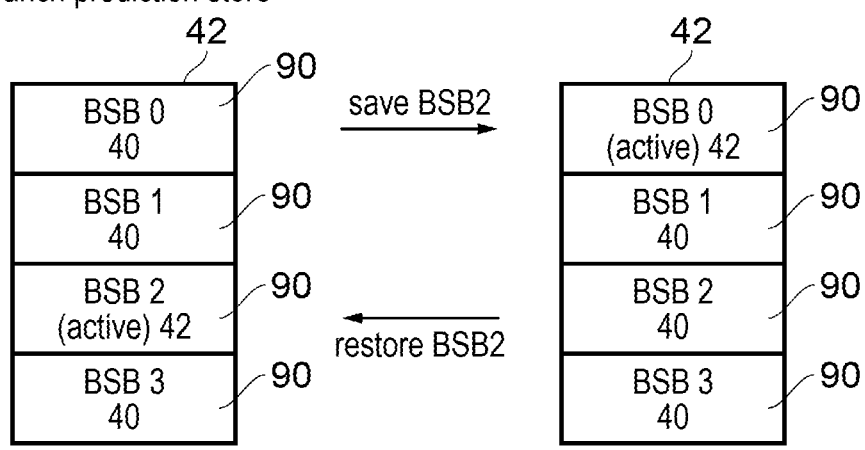
FIG. 7 shows an example in which the branch prediction store comprises a number of regions and the branch state buffer comprises at least one of the regions of the branch prediction store.

However, in other examples the branch state buffer 40 may effectively be implemented using a section of random access memory (RAM) which is shared with the branch prediction store 42 which provides the active branch prediction state. For example as shown in FIG. 7, the RAM may be provided which has enough space to store a given set of active branch prediction state as well as a number of spare slots which can be used to provide multiple instances of the branch state buffer 40 which can be used to store saved items of branch prediction state for a number of different execution contexts. In this case the saving and restoring of branch prediction state could be performed simply by switching which of the regions 90 of the RAM is used to provide the active state used as the branch prediction store 42 for generating branch predictions for the currently executing context, and which regions are used as BSBs 40 to store previously saved state which is no longer updated based on outcomes of actually executed branch instructions, but is retained so that if the corresponding execution context is later executed again then that state can be restored by switching which region 90 represents the active state. This allows the incoming execution context to resume with a partially warmed up branch predictor. It will be appreciated that the approach shown in FIG. 7 could be applied to one of the types of predictor such as the fallback predictor, but need not be applied to other types of predictor unit 50, 51. The approach shown in FIG. 7 can reduce the amount of state transfer required, as simply by tagging regions of the overall storage capacity as active or inactive this can be enough to record which region should be used to make the current predictions. State associated with a previously executed execution context in one of the regions 90 currently used as the BSB 40 may remain in the overall branch prediction store until another execution context is executed which does not already have one of the regions 90 allocated to that execution context and so this may require overwriting of state for a previously executed execution context. Each region 90 for example may be associated with an identifier of the particular execution context associated with the corresponding branch predictor state, to enable decisions on whether an incoming execution context already had branch prediction states saved or needs to start again from scratch.

Figure 8:
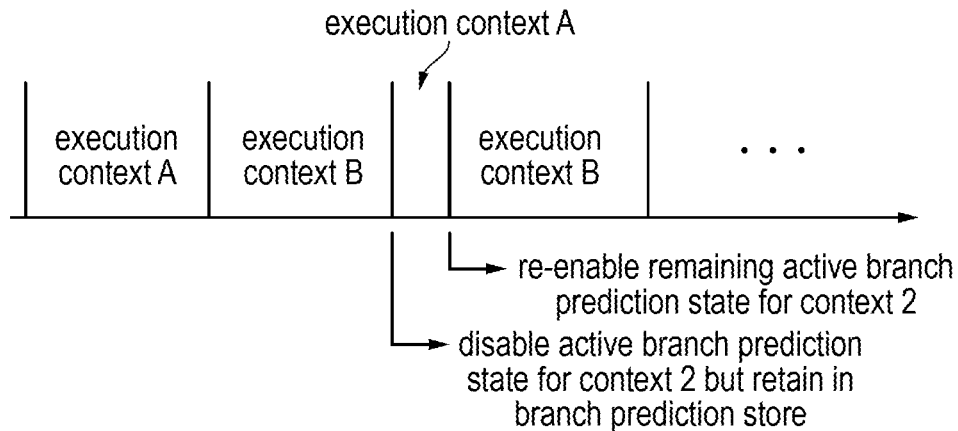
FIGS. 8 to 10 illustrate examples where active branch prediction state is disabled in response to an execution context switch, and if still remaining when a subsequent execution context switch returns to the previous context, is then reenabled.
Figure 9:
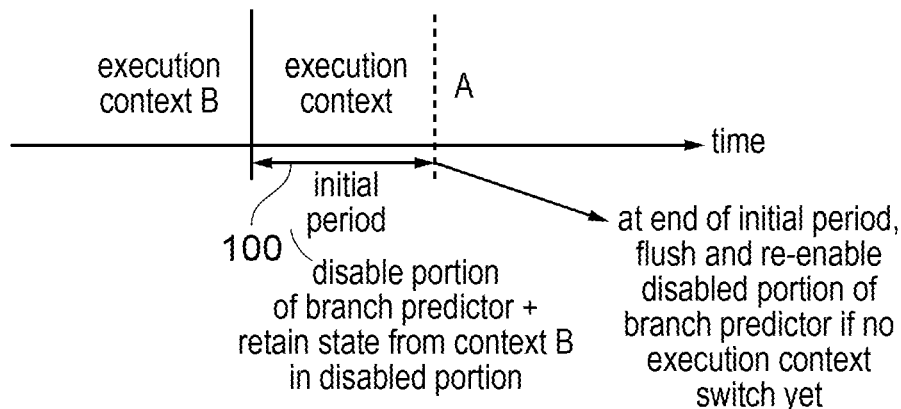
Figure 10:
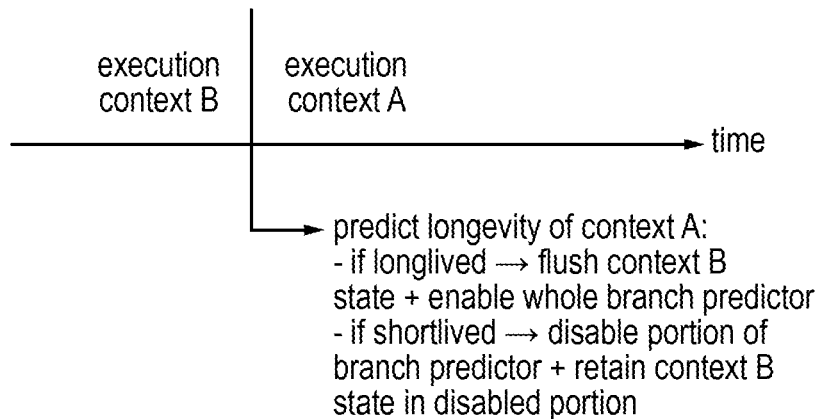

As shown in FIG. 8, when the processing pipeline switches between different execution contexts, sometimes a given execution context may be executed for a longer period than other times. If a given execution context is executed for a relatively short time, and then the processor returns to the same execution context which was executing before the short-lived execution context, then it may be desirable to re-enable any previously active branch prediction state for the resuming execution contexts. For example, in FIG. 8 execution context B executes for a relatively long time and so may build up a set of branch predictor states which may be relatively performance efficient, but then for a short time a different execution context A is executed before returning to execution context B. For the portions of the branch predictor for which state saving and restoring 56, 58 is supported, it may be relatively straight forward to restore the state associated with execution context B. However, for other parts of the branch predictor, such as the predictor units 50 for which no state saving or restoration is performed, if this prediction state is flushed from the main branch prediction store 42 on each execution context, this would mean that such state would have to be retrained from scratch when execution context B resumes. This can be undesirable. FIGS. 9 and 10 show different techniques for enabling the non-saved part of the branch prediction state associated with execution context B to be retained for at least a period of executing from execution context A, in case execution context A lasts for a relatively short period and then the state associated with context B may still be available when processing returns to context B.

As shown in FIG. 9, in some approaches the branch predictor may be unaware of any indication of whether execution context A is likely to be long lived or short lived. In this case, for an initial period 100 of execution at the beginning of the period allocated for execution context A, some portions of the branch predictor 4 may be disabled. For example these disabled portions may be the predictor units 50, 51 whose state is not saved to the branch state buffer 40 by the state saving circuitry 56. For example, this could be the portions of the main predictor and sub-predictors other than the fallback predictor. The branch prediction state associated with these disabled parts of the branch predictor that was trained based on instructions of execution context B may be retained in those prediction stores during the initial period 100 of execution context A. As these portions of the branch predictor are disabled this means that it is not possible for the branch predictor 4 to make predictions of outcomes of branch instructions of execution context A based on the previous branch prediction states associated with execution context B, so that there is still protection against side channel attacks as discussed above.

If a subsequent execution context switch arises before the end of the initial period 100, (e.g. in the case shown in FIG. 8), then if the execution switches back to context B then the previously disabled portions of the branch predictor can simply be reenabled as the branch prediction state associated with context B is still present in those portions of the branch predictor. This means that as soon as context B resumes it can carry on from the point it left off with the level of performance associated with the previously trained branch predictor state. This reduces the impact on performance on context B caused by the temporary switch to context A.

On the other hand, in the case shown in FIG. 9 where the initial period 100 ends without having encountered any subsequent execution context switch, then at the end of the initial period, the branch prediction state that is associated with those disabled portions of the branch predictor (such as the main predictor and sub predictors) can be flushed or invalidated, and then the previously disabled portions of the branch predictor can be reenabled so that execution context A can start to use those portions. This means that during the initial period 100, the predictions for execution context A may be based solely on the fallback predictor 51 whose state was saved to the branch state buffer 40, but once the initial period ends then the full branch prediction functionality may be available to context A. While this approach may initially reduce performance for an incoming context by not making the entire branch predictor available, it has the benefit that when a particular execution context is short lived and processing returns back to the context which was executed before that short lived context, the longer-lived execution context B can be handled more efficiently which will tend on average to increase performance as a whole. The initial period 100 could have a fixed duration (defined in units of time, processing cycles, executed instructions, or branch predictor lookups, for example), or could have a variable duration (e.g. until branch prediction confidence reaches a certain level).

Alternatively, as shown in FIG. 10, rather than constraining the operation of execution context A during the initial period in response to the context switch from context B to context A, the branch predictor could make a prediction of the expected longevity of context A. For example a table could be maintained with a confidence counter or prediction value that has been trained based on previous measurements of the longevity of context A, and if the longevity (duration) of context A is expected to be longer than a certain threshold then it may be assumed that it is not worth retaining the non-saved prediction state associated with context B (other than the prediction state saved to the branch state buffer 40). In this case, when context A is predicted to be long lived, the non-saved part of context B's prediction state may be flushed from the branch prediction store 42 and the whole branch predictor including all of the predictor units 50, 51 may be enabled for making predictions for context A immediately from the start of processing from context A, rather than waiting for the end of the initial period 100.

If instead context A is predicted to be short lived (with a duration less than a threshold), then in response to the context switch from context B to context A the portion of the branch predictor which corresponds to the state which is not saved to the branch state buffer may be disabled, and the state associated with the disabled portion that was trained based on instructions from context B may be retained throughout the processing in context A. Hence with this approach the disabled portions would remain disabled until another context switch occurs and processing returns to a different context.

Hence, regardless of which approach is used in FIG. 9 or FIG. 10, in general as shown in FIG. 8, if there is any remaining active branch prediction state recorded in the main branch prediction store 42 associated with an incoming context B at the time of a context switch from an outgoing context A, then that remaining active branch state can be reenabled so that it can be used to make branch predictions for the incoming context B without needing to restore any state from the branch state buffer. This can be particularly useful for any portions of prediction state which is not included in the compressed view of branch prediction state recorded in the branch state buffer 40.

Figure 11:
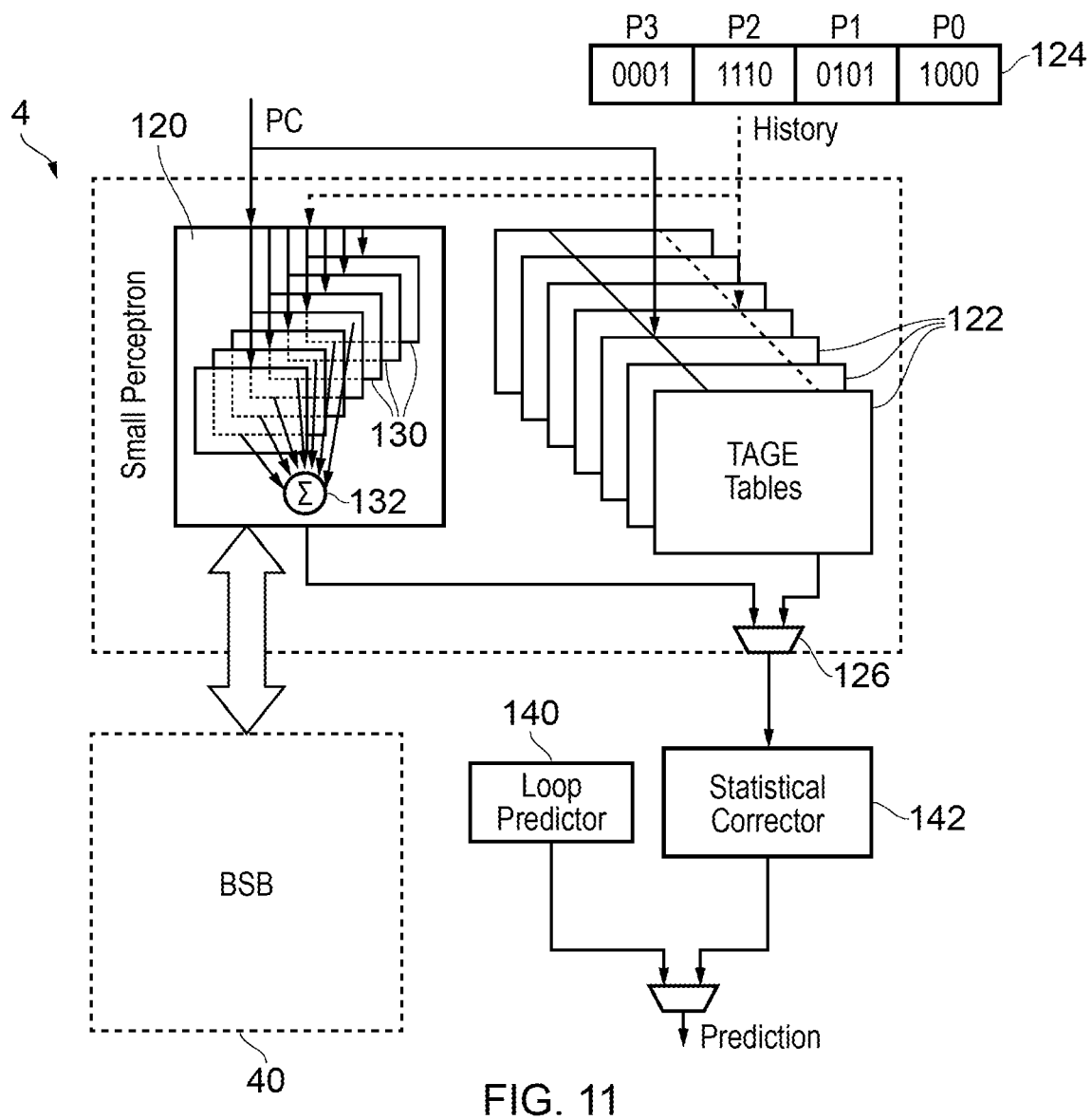
FIG. 11 illustrates an example of a TAGE branch predictor which uses a perceptron predictor as a fallback predictor.

FIG. 11 shows an example design of branch predictor 4 which may provide improved performance in the transient condition immediately following flushing of branch prediction state in response to an execution context switch. The branch predictor 4 is implemented as a TAGE branch predictor which uses a relatively small perceptron predictor 120 as the fallback predictor which provides a fallback prediction in case the main TAGE prediction tables 122 cannot provide a sufficient level of confidence. The total volume of prediction state is smaller for the perceptron predictor 120 than the TAGE tables 122. The TAGE predictor 4 may also include additional structures such as a loop predictor 140 for detecting program loops and a statistical corrector 142 for correcting previously detected false predictions in the main predictor.

Both the main TAGE prediction tables 122 and the perceptron 120 are looked up based on lookup information derived from the program counter (PC) and execution history information 124 which indicates a sequence of behaviour that led up to the instruction represented by the program counter. For example the history 124 may comprise a sequence of bits indicating past branch history, such as a sequence of taken and not taken outcomes for previously executed branches. It will be appreciated that different TAGE schemes may use different representations of the history 124, and that any known TAGE lookup scheme may be applied. In general, the history 124 may be divided into a number of portions (for example P0 to P3 in the example shown in FIG. 11) and each TAGE table 122 may have its prediction entries indexed based on a different length portion of the history value 124. For example a first TAGE table 122 could be indexed based on a function of the program counter and portion P0, a second TAGE table 122 could be indexed as a function of the program counter and portions P0 and P1, a third TAGE table could be indexed as a function of the program counter and the combination of portions P0, P1, P2, and so on. Each TAGE table may provide a number of prediction state values, for example bimodal confidence counters, or larger counters which record confidence at finer granularity than the 2-bit bimodal counter. When the TAGE tables 122 are looked up based on the program counter and the history 124, then each table may output an indication of whether there was a hit, and if there was a hit, the prediction derived from that table and the level of confidence associated with that prediction. A selector 126 may select between the different predictions output by the TAGE tables such that if multiple TAGE tables 122 each output a prediction with a confidence level higher than a certain threshold, then the selector 126 may select, as the TAGE prediction, the prediction output by the TAGE table 122 which used the longest portion of the history 124 to generate the index to that TAGE table. This recognises that if there was a match against a longer history, then it is more likely that this prediction will be accurate than if there was a match against a shorter history, as more information about the past execution behaviour which led to the current instruction represented by the program counter has been considered in deriving the prediction.

However, sometimes the TAGE tables 122 may not be able to provide an appropriate prediction for the current program counter and history 124, for example when an instruction is encountered in a new scenario which has not been previously been detected. Hence, sometimes each of the TAGE tables 122 may output a TAGE confidence which indicates a confidence lower than a certain threshold. Also, in some cases the lookup may simply miss in all of the TAGE tables (this can be interpreted as a confidence level of 0 or the minimum confidence level). The perceptron predictor 120 is provided as a fallback predictor to provide a fall back prediction in case the TAGE tables 122 cannot provide a prediction with a sufficiently high level of confidence. Hence, when the TAGE confidence derived from the confidence indications stored in the TAGE tables 122 is not high enough, the selector 126 may instead select the fallback prediction output by the perceptron predictor 120.

As shown in FIG. 11, the perceptron predictor 120 includes a number of weight tables 130 which each store a number of weight values which can be used to multiply respective portions of the program counter and/or the history value 124 (and optionally hashes of other information could also be considered) so as to generate a weighted sum using an adder 132. Again, a wide variety of perceptron schemes are known in the literature which specifies different ways of applying the weights to the different portions of the lookup information, but in general the perceptron is a type of branch predictor where the generated prediction confidence depends on the sum of a number of terms depending on weights selected from tables indexed based on parts of the program counter and/or the history 124. For example, each weight table may be indexed based on a different portion of the lookup information, so that the sum is generated based on terms each derived from a weight selected from a different weight table 130. In some implementations the selected weights could be added directly to provide a prediction which indicates the taken/not taken outcome and the predicted level of confidence. In other implementations the weights could be used to multiply corresponding portions of the lookup information, and the products of the weights and lookup information can be added to generate the prediction.

A perceptron predictor would normally be regarded as a distinct type of predictor in its own right, rather than being included as the fallback predictor 120 in a TAGE predictor 4 as shown in FIG. 11. However, as discussed in the performance analysis described below, using a perceptron as the fallback predictor of a TAGE predictor can be particularly useful in the scenarios discussed above where there are frequent flushes of branch prediction states on execution context switches. This is because the perceptron can, in a relatively small amount of a branch prediction state, provide a relatively high amount of performance boost when the perceptron state is restored from the branch state buffer 40 following an execution context switch or other restoration event. Compared to a TAGE predictor which uses a bimodal fallback predictor, this can provide much greater performance in the transient operating condition.

Figure 12:
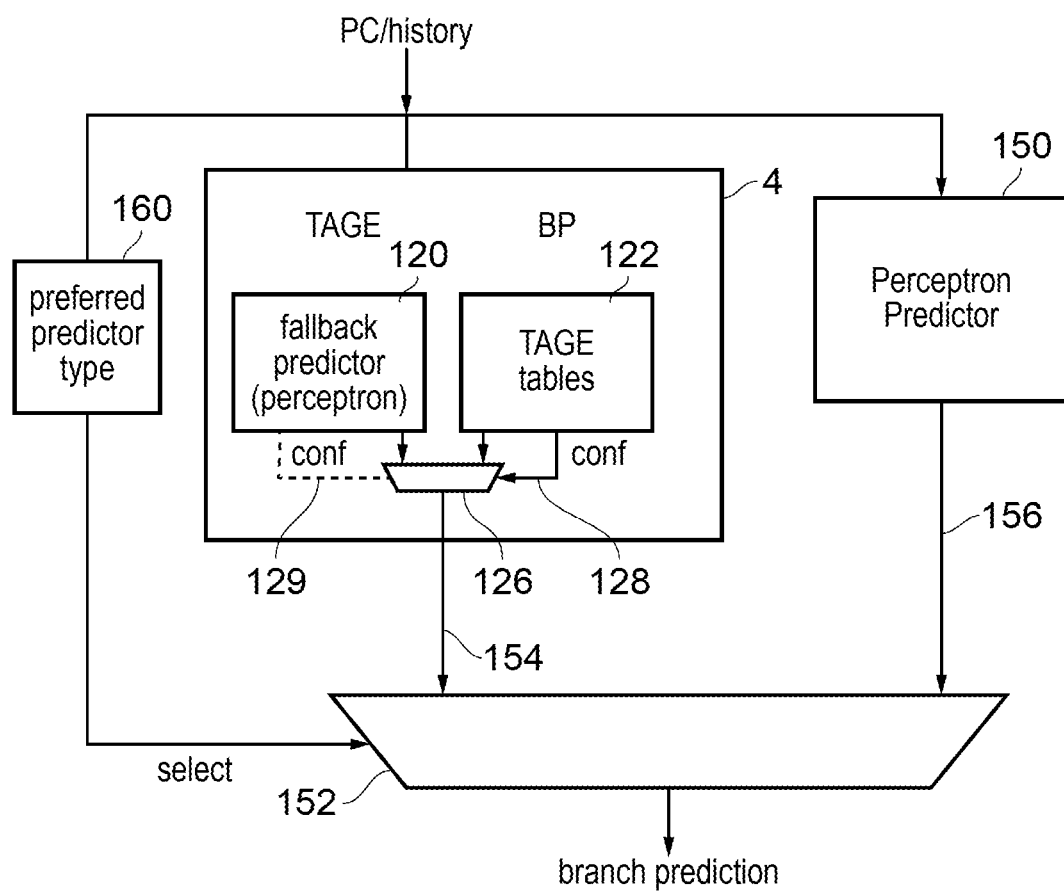
FIG. 12 illustrates an example where the TAGE branch predictor of FIG. 11 is combined with a further perceptron in a hybrid prediction arrangement.

As shown in FIG. 12, the TAGE predictor 4 of FIG. 11 may itself form part of a larger hybrid predictor which may include an additional perceptron predictor 150. That is, the TAGE branch predictor 4 may still include the main TAGE tables 122 and the perceptron 120 which acts as the fallback predictor of the TAGE branch predictor 4. The selector 126 within the TAGE predictor 4 may still select between predictions between the TAGE tables 122 and the fallback predictor 120 based on a confidence indication 128 derived from the confidence value stored in the TAGE tables 122 themselves (and in some cases, a confidence indication 129 received from the perceptron predictor 120 may also be considered).

However, in addition a further selector 152 may then select whether to use the prediction 154 output by the TAGE branch predictor 4 (which could be based on the TAGE tables 122) or the fallback predictor 120) or a further perceptron prediction 156 provided by a further perceptron predictor 150 which may be a more complex predictor than the perceptron used as the fallback predictor 120. Such hybrid predictors which introduce multiple forms of branch prediction can be useful for improved performance in applications where the area overhead is less significant. However unlike the selector 126 within the TAGE branch predictor 4, the selector 152 which selects between the TAGE branch predictor 4 and the perceptron predictor 150 may select one of the predictions 154, 156 based on a separate table 160 indicating the preferred predictor type for a given combination of program counter and execution history, which is independent of the TAGE tables 122. For example the TAGE table 160 may be learnt from past assessment of which of the perceptron prediction 156 and the TAGE prediction 154 is more accurate for certain branches. Hence, the selector 152 may not consider the specific confidence indication 128 which is output by the TAGE tables 122 themselves.

Branch Predictor Flexibility

Modern processors use branch prediction to improve system performance. As a consequence, predictors have become larger and increasingly more sophisticated to achieve higher accuracies. However, due to the presence of context switches and core migrations, branch predictor designs do not manage to reach steady-state accuracy. Furthermore, they dilute their accuracy by storing multiple histories from different processes, which also creates opportunities for branch predictor side-channel attacks. Under these circumstances, we anticipate the need for branch predictors to isolate processes and be effective with less warmup time.

In this work, we (1) introduce the notions of steady-state and transient predictor accuracy, (2) show that current designs underperform in realistic workloads that context switch frequently. To solve this, (3) we design a hybrid predictor and a novel mechanism that can store a reduced branch predictor state and retain performance, when context switching or migrating. Our results show that, compared to the state-of-the-art, misprediction rates are reduced by a factor of 2 for fine-grained switches without increasing area. At the same time, our mechanism makes thread isolation practical, as restoring the reduced state stop the predictor from executing cold.

I. INTRODUCTION

Branch prediction contributes to high performance in modern processors with deep pipelines by enabling accurate speculation. Since the inception of the idea of speculative execution, the improvement has gradually increased overall processor performance, as Branch Prediction (BP) designs have steadily become more sophisticated and more complex.

Initially, when there was less concern for area, and pipelines where becoming increasingly deeper, accuracy was the dominant factor in predictor design. However, as power became a limiting factor, designs had to take into account more constraints. Predictors had to keep improving accuracy as their primary goal, but also had to consider power and area.

Systems in general have become significantly more complex today, featuring multiple types of cores and accelerators on a single die. Software, taking advantage of the aforementioned improvements, has also changed enabling more applications to be handled simultaneously. Applications today are often multithreaded and systems context switch (CS) more frequently between processes or even migrate across cores.

This adaptability of execution comes at a cost for branch prediction, as with every switch a penalty is incurred and some of the state is no longer accurate for predictions. Additionally, recently discovered micro-architectural vulnerabilities can lead to potentially exploitable side-channel attacks, which can be dealt with by scrubbing the branch predictor state when context switching. This method isolates processes from each other ensuring no leaks, albeit at the expense of performance as the predictors have to reset systematically.

Figure 13:
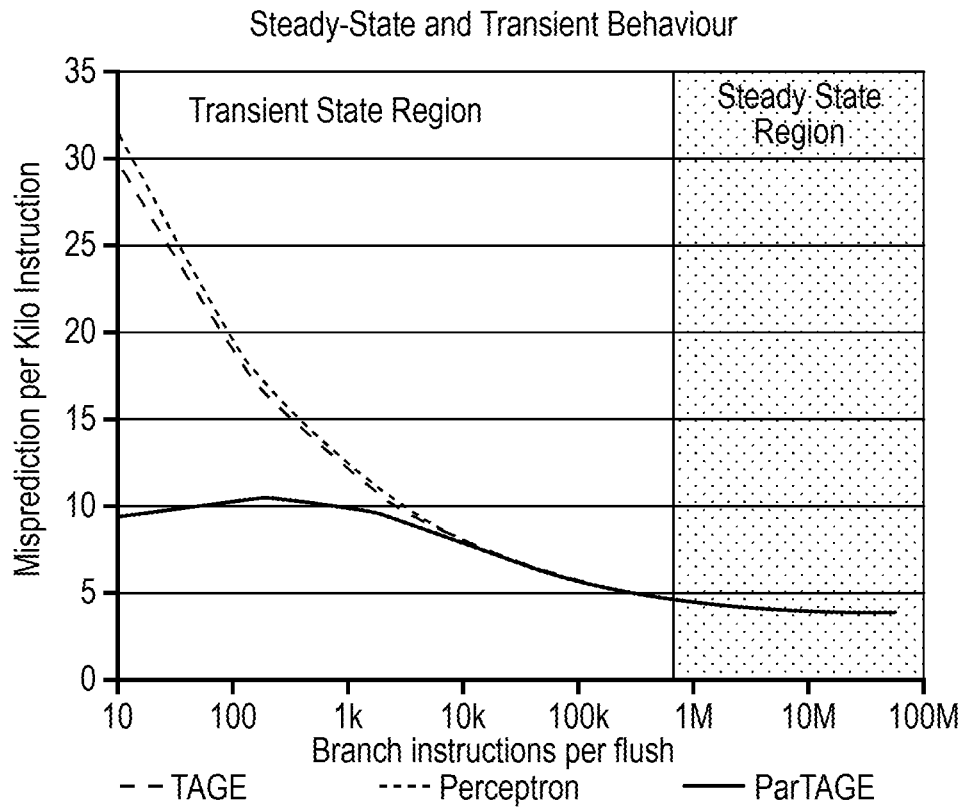
FIG. 13 is a graph comparing performance of a predictor similar to that of FIG. 11, that stores partial state, to conventional TAGE and perceptron predictors that do not preserve state through context switches.

The above observations makes us believe that future system designs will need to take into account one more additional design constraint, that of being able to deal with frequent operation disruption and warm-up efficiently. For the BP mechanism in particular, future designs should be able to deal with frequent migrations between different cores, and similarly guarantee the isolation of speculation between different applications, without compromising accuracy. This can be described by distinguishing between steady-state and transient predictor accuracy as shown in FIG. 13. FIG. 13 provides a comparison of TAGE and Perceptron with our predictor, ParTAGE (described below), that preserves a minimal state between flushes. This can significantly reduce mispredictions due to context switches, migrations or state clearing for security purposes.

Contributions include:

We introduce the notion of transient prediction accuracy and show that it differs from the steady-state performance, with which designs are evaluated today.

We show that current state-of-the-art branch predictors perform notably worse, as frequent context switches and migrations do not permit them to fully warm up. We argue that this can be addressed with designs that can cope with frequent disruptions.

We propose and evaluate a novel mechanism to reduce cold-start effects, by preserving partial branch predictor state per context. We use our branch predictor design, ParTAGE, that achieves the same high accuracy at steady-state but has superior transient accuracy.

Due to speculative execution, branch predictors are a critical part of modern core design, drastically increasing processor performance. However, events like context switches can reduce the effective branch predictor accuracy and lead to performance loss. Furthermore, examples identified in recent work show that context switching and loss of branch predictor state will become a more prominent case for future systems, notably affecting their operating performance.

A. Motivating Examples

We identify three scenarios that warrant more flexible branch predictors, which assimilate information better and reach their maximum performance faster.

Migrations in Heterogeneous Systems:

Research in heterogeneous systems has shown that enabling migrations, as frequent as 1 k instructions, between heterogeneous cores can unlock potential performance and energy savings and enable operation at improved energy delay product levels. However, recent findings show that while the overheads of in-order cores stem primarily from cache misses and the inability to mask memory latency, accurate speculative execution and thus branch prediction is critical for out-of-order (OoO) core designs.

Figure 14:
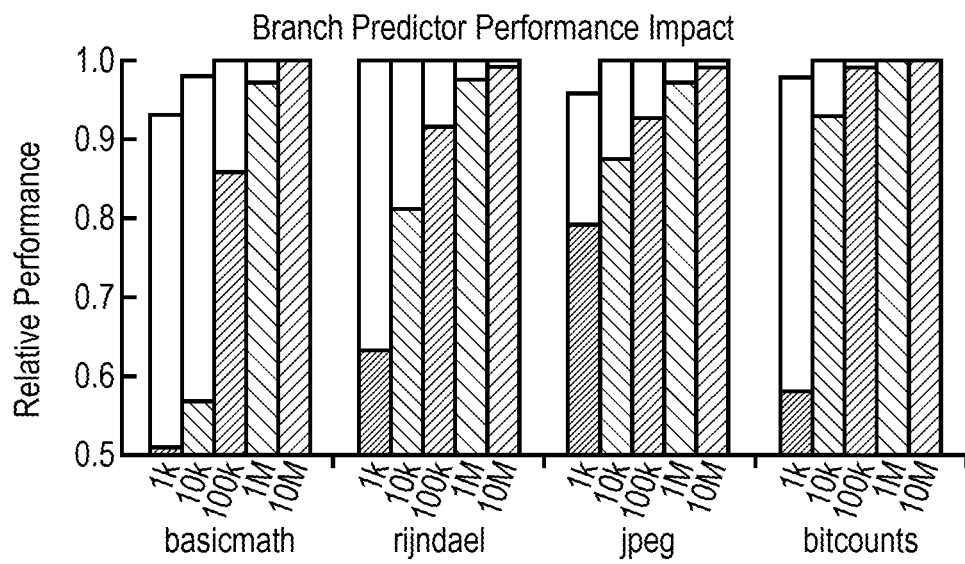
FIG. 14 is a graph illustrating the performance impact of enabling a branch predictor to start with a fully warmed state following a context switch to a new core.

Following current design trends, future systems will incorporate a plethora of heterogeneous cores targeting specific applications. The challenge with heterogeneous systems is that they will need to provide an efficient transfer of data and context between the cores. Cold-start effects in the branch predictor significantly degrade performance up to 40% in frequent migration scenarios, as shown in FIG. 14, which shows a simulated system using an Out-of-Order core design that performs a migration to the same core type at different instruction periods. The solid bars lose the BP state, while the outlines retain it. Results are normalized to a system that continues without migrating.

Sharing branch predictors would be a solution, however, this is problematic because branch predictors are directly tied to cores, having very strict latency constraints in order to be able to provide predictions in time. Additionally, heterogeneous systems combine drastically different core designs, in order to cover more power/performance points of operations. As such an InO core has a much smaller front end with a smaller branch predictor compared to aggressive OoO cores. Instead of directly sharing, we analyse branch predictors for their "essential" state and show how this can be used (or transferred) to improve cold-start behaviour.

Security, Isolation and Speculative Side-Channels:

Another case which warrants attention for future branch predictor designs stems from the potential micro-architectural exploits related to speculative execution. Recent studies have shown that side-channel attacks leaking sensitive data are possible in most contemporary CPU designs. As these exploits take advantage of hardware oversights at design time, mitigation techniques are often hard, impractical due to notable performance loss, or completely unaddressable. Spectre and BranchScope vulnerabilities are an illustrative example of the magnitude of these threats, both in terms of the danger they present, and the difficulty addressing them in already deployed hardware.

While mitigation techniques for the known exploits have been deployed, the question remains about the potential unknown exploits and whether current safeguards are effective. Isolation is usually accepted as a sufficient measure to ensure no leaks occur, but often comes at the expense of performance. For branch prediction, clearing the branch predictor of any state for each context switch is considered to take care of such side-channels, albeit with a performance drop with every switch. A more flexible design that can train efficiently and quickly assume its steady-state performance will be useful in a post Meltdown and Spectre world.

The Increase in Context Switching:

An additional reason that motivates us to improve the warm-up behaviour of branch predictors stems from the performance lost when context switching. Even for small and simple designs, context switches degrade performance, and that the effects worsen as the complexity and the size of predictors increases. For example, the difference in prediction rate of a 1 k entry skew predictor is 7%. We present in Table I context switch numbers extracted from a modern mobile device (Google Pixel phone):

TABLE I

| Applications | Time (s) | Context switches (CS) | CS/s |
|---|---|---|---|
| adobereader | 73 | 459,699 | 6,279 |
| gmail | 23 | 228,924 | 9,833 |
| googleslides | 108 | 343,788 | 3,185 |
| youtube | 36 | 418,254 | 11,487 |
| yt_playback | 21 | 224,631 | 10,698 |
| angrybirds_rio | 81 | 406,711 | 5,044 |
| camera@60fps | 60 | 1,958,557 | 32,643 |
| geekbench | 60 | 129,533 | 2,159 |

These show that context switches for Android applications can be as high as 32 k per second. This roughly translates to 1 context switch every 64 k instructions or every 12 k branch instructions. We have measured an idle system to have 4000 CS/s.

Another interesting point is that traditionally, devices (such as I/O, non-volatile memories, and accelerators) had a latency that was in the millisecond range while context switches took microseconds to complete. This meant that a system could context switch and remain useful instead of waiting. However, these millisecond overheads are expected to be driven down in the future, making them comparable to those of context switching. Systems will find less opportunity to mask device latency by switching, as those exploitable windows become smaller. To solve this, context switches will need to become more efficient and enable execution streams to be multiplexed at a finer level.

We therefore argue to redesign components such as branch predictors to be able to adapt to a more volatile environment, where context switches are more frequent and short-lived.

B. Branch Prediction Design

Branch prediction has evolved over the years from small and simple designs to large, complex structures storing long histories of control flow. Here, we focus on two designs: the TAGE predictor, and the Multiperspective Perceptron predictor.

TAGE-Based Predictors:

The TAGE predictor is one of the most accurate designs. It uses tagged geometric history lengths that capture correlation from remote branch outcomes and recent history. Internally, TAGE is comprised of tables that store the information for different history lengths. In short, when a prediction is needed TAGE searches for the match belonging to the table with the longest history. If no match is found it uses its fallback predictor, a bimodal design, as a fall-back mechanism.

Figure 15:
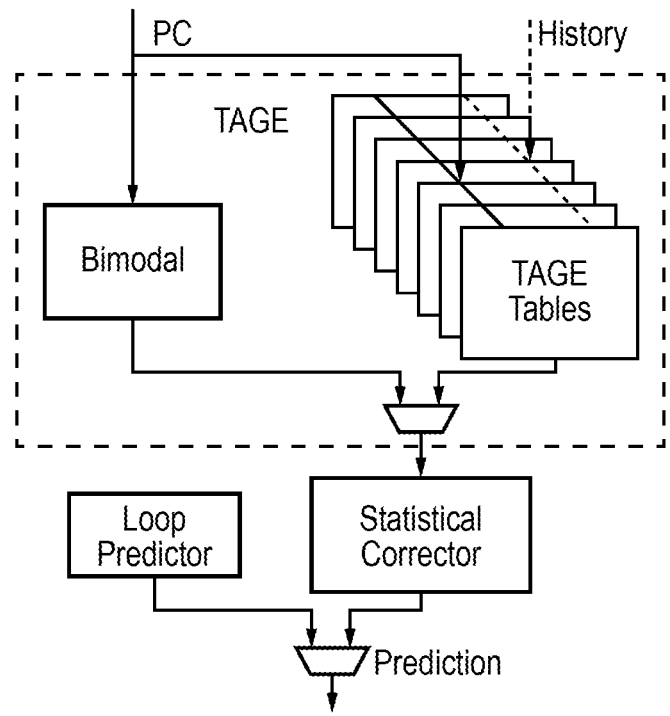
FIG. 15 illustrates an abstract representation of a TAGE predictor using a bimodal predictor as the fallback predictor.

The TAGE design has been improved over the years incorporating other small components in order to further improve its performance in cases where the original design was shown to frequently mispredict. For example, the TAGE-SC-L predictor also incorporates a statistical corrector and a loop predictor as shown in FIG. 15.

Figure 16:
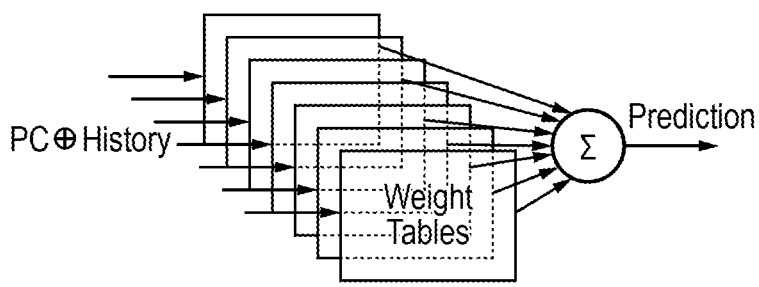
FIG. 16 illustrates an abstract representation of a multi-perspective perceptron predictor.

Perceptron Type Predictors:

The Perceptron predictor is loosely based on neural network theory. Perceptron type predictors achieve high accuracy from efficiently stored state. The principle behind Perceptron, as shown in FIG. 16, uses a table with sets of weights that are multiplied with the history bits. The output and confidence of the predictor depends on the sign of the sum of all the history×weight products. The confidence can be deduced from the magnitude of the sum of the products. Modern versions of Perceptron have reduced the amount of calculations required for each prediction and use multiple hashing tables of weights that are indexed using both the history and the branch address (PC). These tables are commonly referred to as feature tables. In more modern Perceptrons, rather than actually multiplying portions of the history with the weights, the history portions are used to index into the weight tables, and the weights selected based on the history and/or PC are then added directly to form the prediction (without needing to multiply the weights with the history).

III. PREDICTOR FLEXIBILITY

Branch predictors have been evaluated based on how accurate their predictions are; given a reasonable amount of history they can learn from. However in many real world cases they operate in a time-frame much shorter than the ideal, predicting from a partially warm, partially overwritten state. Large predictors that store more information are usually able to deliver better predictions. However, if the state is lost or invalidated before the predictor has time to warm up, then effectively it will not reach peak performance. In this case, a smaller predictor might be able to deliver equivalent performance for a fraction of the state.

A. Steady-State and Transient Accuracy

We therefore distinguish between steady-state and transient accuracy. The term steady-state accuracy refers to the performance of the branch predictor when it has fully saturated. Conversely, transient accuracy describes the behaviour of a predictor during the warm-up phase. To quantify transient accuracy, we propose flushing the branch predictor state across different branch instruction periods and tracking the change in average mispredictions per kilo-instruction (MPKI).

B. Preserving Speculative State

Figure 17:
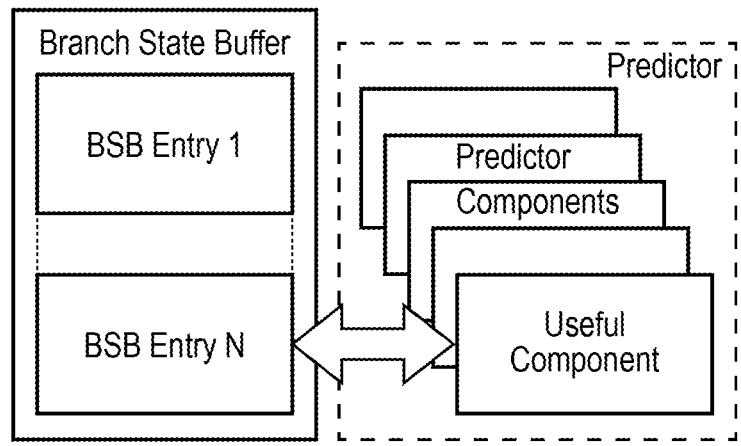
FIG. 17 shows a mechanism for saving and restoring branch prediction state.

To improve transient accuracy, we propose a mechanism (FIG. 17) that allows the state of the branch predictor to be stored. The mechanism, triggered after context switches or migrations, stores the state in a dedicated buffer called the branch state buffer (BSB).

The branch state buffer is tightly coupled with the branch predictor and can retain multiple separate entries. Ideally, storing the entire state would enable high accuracy without any warm-up time. However, the size of designs today is too large to fully store without incurring notable overheads. To reduce the additional transfer and storage costs, we aim to make this component as small as possible. We find that 10 kBits (1.25 kB) is a useful size in our experiments. We therefore propose using a reduced state that sacrifices accuracy, but it can still deliver better performance than a large but "cold" predictor.

An additional benefit of storing a reduced state is that it makes isolation of processes efficient and, as a consequence, improves security. Storing branch predictor state in the additional buffer on context switches, keeping that state per process, and restoring it when resuming the context (with an otherwise cleaned predictor) ensures that branch predictor state is never shared between mutually untrusted processes and the kernel. The performance hit is softened in this case, as the preserved state retains a part of the performance.

Our study examines the TAGE and Perceptron predictors which are heavily modular. We dissect them and identify the best way to reduce their state so that the most performance can be retained in situations of frequent switching.

TAGE uses a bimodal base predictor, a number (e.g. 12) of tables for the main TAGE predictor, a statistical corrector, and a loop predictor. These components vary in size and how much they affect the overall accuracy. We assess their contribution to the prediction as the predictor warms up for different frequencies of state flushing.

The evaluated Multiperspective Perceptron design uses multiple hash tables to deliver a prediction. The design also uses some auxiliary components to improve the accuracy, for instance the inner most loop iterator (IMLI), and several records that track when certain branches were encountered in the past.

The question, in this case, is what method is used to reduce the data in the most impactful way. This question is not trivial, as it is directly tied to the BP implementation and the amount of state that can be stored efficiently when taking into account the overhead constraints. We investigate state reduction techniques for both predictors that are closely tied to the specifics of each baseline; and show how to optimise data reduction versus retained prediction accuracy.

One way to preserve state, is to select certain components that provide a good balance of the amount of data stored and accuracy achieved and discard the state of the remaining components. This "vertical cut" method can be used in the case of TAGE as it is comprised of various components that can provide accurate standalone predictions.

For instance, the base predictor can be isolated from the rest of the components and still provide reasonable accuracy. Similarly, separate TAGE tables can be preserved instead of the entire design, to target certain history lengths.

Some components however, provide only complementary benefit to the predictions. It therefore does not make sense to consider preserving the state of all components. For instance, the loop predictor is a relatively small component that identifies regular loops with a fixed number of iterations. The overall effect of this component on the accuracy of TAGE-SC-L is measured to be around 0.3% improvement.

Another way to preserve state is to partially store state across the predictor components. For TAGE this can be done by naively saving a portion of each of the TAGE tables. The reasoning behind this "horizontal" approach is to capture information across all of the history, albeit with less accuracy than storing the entire state. The same method can be used to preserve Multiperspective Perceptron state, as all the tables are combined to provide accurate predictions. This case can store more information as the perceptron tables have by design multiple indices condensing the amount of data stored in each entry.

C. Perceptron Amplified/Reinforced TAGE

We propose a hybrid approach to preserving the state we call ParTAGE-Perceptron amplified/reinforced TAGE. This designs uses a Multiperspective Perceptron predictor with smaller and fewer feature tables as the base predictor of the TAGE design, replacing the bimodal predictor. The Perceptron used is the same size as the replaced bimodal consuming up to 10 kbits of "budget".

ParTAGE also incorporates a branch state buffer, which is a multiple of the base predictor in size. This size compatibility enables ParTAGE to store the Perceptron state into the branch state buffer when stopping the execution of a context, and restore it when it resumes. This addresses the issues described above, as the state can therefore be preserved throughout context switches.

Figure 18:
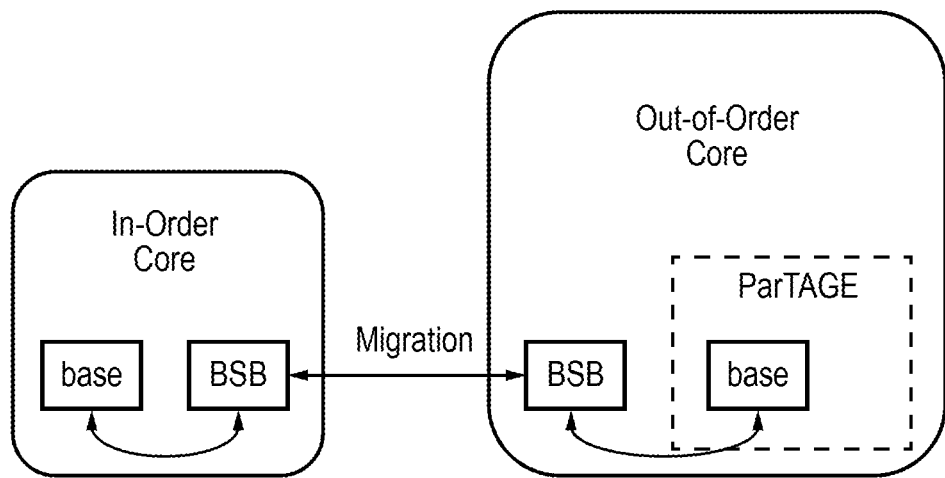
FIG. 18 illustrates an example of migrating branch prediction state between processing elements.

Additionally, as the state is stored per context in the BSB, the rest of the branch predictor design can be cleared to eliminate the possibility of side-channel leaks targeting the branch predictor. For migrations across cores, the respective BSB state can also be pushed to the target core to reduce transfer overheads. This can also be applied to heterogeneous multiprocessors, where the base predictor of an OoO core perfectly matches the entire predictor of the coupled in-order core used for efficiency. This is shown in FIG. 18. For example, the branch predictor in the in-order core (second processing element) may have exactly the same design as the base predictor of the ParTAGE branch predictor in the out-of-order core (first processing element), to make migration of workloads between cores straightforward. On migrating a workload from the OoO core to the In—O core, the branch prediction state associated with other parts of ParTAGE other than the base predictor can be discarded, while on migrating a workload from the In—O core to the OoO core, those other parts of the ParTAGE can be initialised with default values.

To reduce the size of the Perceptron within the range of the allocated budget, we use a similar configuration to the 8 kB Multiperspective Perceptron with 8 smaller feature tables instead of 16. The limited size of the Perceptron in ParTAGE enables its state to be preserved when context switching or migrating. In the intermediate warm-up state, ParTAGE has t select between transient prediction of the TAGE tables and the steady-state prediction of the preserved Perceptron. We design two versions of ParTAGE; one that hardwires the Perceptron predictor to be always chosen during the transient phase of the predictor, and one that assesses the confidence of the prediction of the base perceptron predictor before selecting the outcome.

IV. EXPERIMENTAL SETUP

The experiments conducted use the CBP5 framework with the traces from 2016 as a base. The framework uses 268 traces, with combinations of long/short, and mobile/server workloads. We slightly modify the CBP framework so that the branch predictors can perform a full or partial flush of their state. This enables temporal studies of the behaviour of branch predictors, showing what effects a full or partial loss of state has in the structure.

For our experiments, we use a variety of predictors that are commonly used today. As a baseline design, we implement a set of bimodal type predictors, with and without hysteresis. To compare more contemporary predictors, we use the submitted TAGE-SC-L [A. Seznec, "TAGE-SC-L branch predictors", JWAC-4: Championship Branch Prediction, 2014] and Multiperspective Perceptron without TAGE [D. A. Jiménez, "Multiperspective Perceptron Predictor"] from CBP5. We lightly modify both designs so that we can flush their designs partially or completely when needed; carefully retaining their exact steady-state behaviour.

Furthermore, we implement two variants of ParTAGE that express different policies for the selection of the best transient prediction. ParTAGE-S overrides the prediction of the TAGE tables below a period threshold which we have set to be 200 k branch instructions. ParTAGE uses an integrated confidence value that is assessed by the rest of the TAGE design in order to indicate the most accurate prediction.

We focus on 8 kB and 64 kB predictors, similar to the ones that are evaluated at CBP. A detailed list of all the evaluated predictors is shown in Table II:

TABLE 2-continued

| Name | Type | Size | Details |
|---|---|---|---|
| TAGE 8 kB | TAGE | 8 kB | Loop Predictor, Statistical Correlator, BiMH1 base predictor |
| ParTAGE 64 kB | TAGE/ Perceptron | 64 kB | Loop Predictor, Statistical Correlator, 1.25 kB 8 table Perceptron as base predictor |
| ParTAGE 8 kB | TAGE/ Perceptron | 8 kB | Loop Predictor, Statistical Correlator, 1.25 kB 8 table Perceptron as base predictor |

We assess the transient accuracy of the evaluated predictors for the cases outlined in Section II. To achieve this, we cover a range of flushing periods from 10 to 60M branch instructions per flush; extracting the optimal design for each use case.

V. RESULTS

We perform three different types of comparisons focusing on simple bimodal predictors, contemporary TAGE and Perceptron designs, and our ParTAGE proposal.

A. Bimodal Accuracy Results

Bimodal is used as a base experiment, consisting of a single table of counter bits. In Table III we show how the MPKI of different bimodal designs improves as the state retention period increases:

TABLE III (MPKI for different BPs over different branch instruction flushing periods)

| | Branch instruction flushing period (instructions) | | | | | | | | | |
|---|---|---|---|---|---|---|---|---|---|---|
| Name | 10 | 100 | 200 | 2k | 20k | 200k | 2M | 20M | 40M | 60M |
| BIM 64kB | 36.77 | 22.22 | 19.52 | 14.12 | 12.13 | 11.40 | 11.16 | 11.14 | 11.15 | 11.15 |
| BIM 1kB | 36.78 | 22.26 | 19.58 | 14.40 | 12.87 | 12.59 | 12.52 | 12.51 | 12.51 | 12.51 |
| BIMH 40kB | 30.97 | 19.33 | 17.23 | 13.40 | 12.04 | 11.56 | 11.41 | 11.39 | 11.39 | 11.39 |
| BIMH 10kB | 30.96 | 19.34 | 17.24 | 13.43 | 12.10 | 11.63 | 11.49 | 11.47 | 11.47 | 11.47 |
| BIMH 1.25kB | 30.97 | 19.39 | 17.33 | 13.68 | 12.53 | 12.17 | 12.08 | 12.07 | 12.07 | 12.07 |
| BIMH 625B | 30.99 | 19.45 | 17.42 | 13.93 | 12.91 | 12.62 | 12.55 | 12.54 | 12.54 | 12.54 |

TABLE 2

| Name | Type | Size | Details |
|---|---|---|---|
| BiM 64 kB | Bimodal | 64 kB | 2-bit counter |
| BiMH 1 kB | Bimodal | 1.25 kB | 8 kbits counter, 2 kbits hysteresis |
| BiMH 625 B | Bimodal | 625 B | 4 kbits counter, 1 kbits hysteresis |
| Perceptron 64 kB | Perceptron | 64 kB | 37 feature tables |
| Perceptron 8 kB | Perceptron | 8 kB | 16 feature tables |
| TAGE 64 kB | TAGE | 64 kB | Loop Predictor, Statistical Correlator, BiMH1 base predictor |

Despite a 100× difference in size, the steady state MPKI increase is only 12.28%. The results reveal that, while size contributes to the steady-state accuracy, transient accuracy is not affected by the size of a predictor design.

Figure 19:
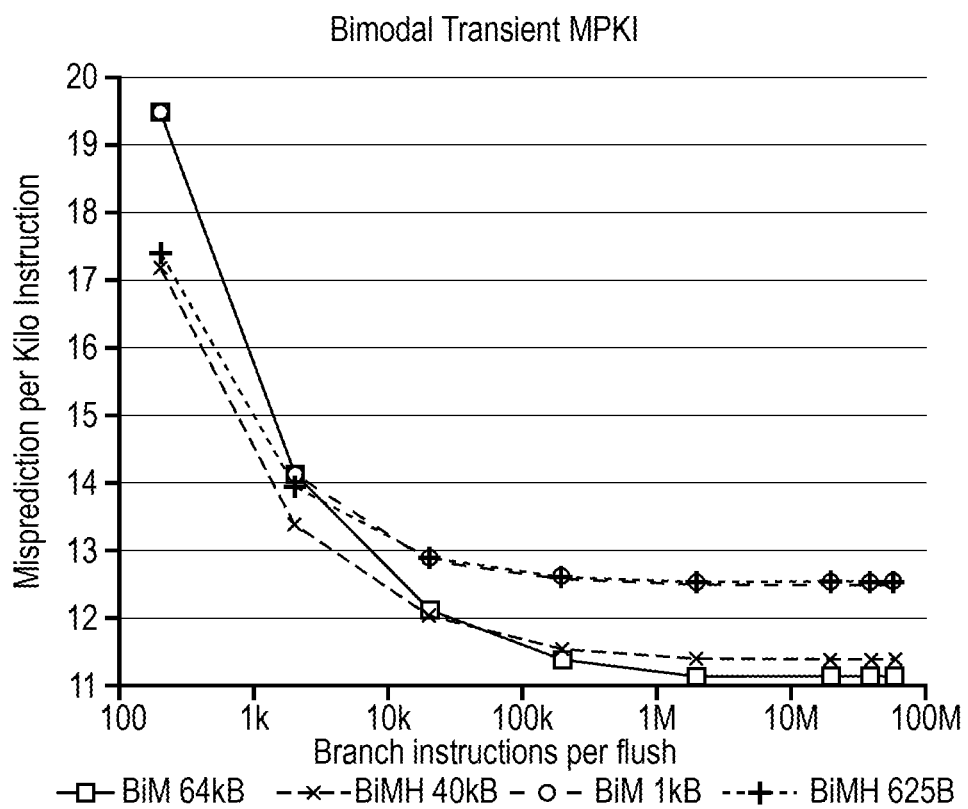
FIG. 19 is a graph comparing different sizes and types of bimodal predictors.

Instead, a variation in the design such as adding hysteresis (sharing of part of prediction state values between entries—used in the BIMH variants shown in Table III) improves transient accuracy, even for smaller predictors. This happens as the hysteresis bits also affect neighbouring branches and ultimately warm-up the design faster. This is clearly visible at smaller flushing periods where the misprediction is on average 18% lower for the bimodal designs with hysteresis. FIG. 19 shows the difference in performance for different bimodal sizes and designs.

B. Transient Accuracy: TAGE Vs Perceptron

Figure 20:
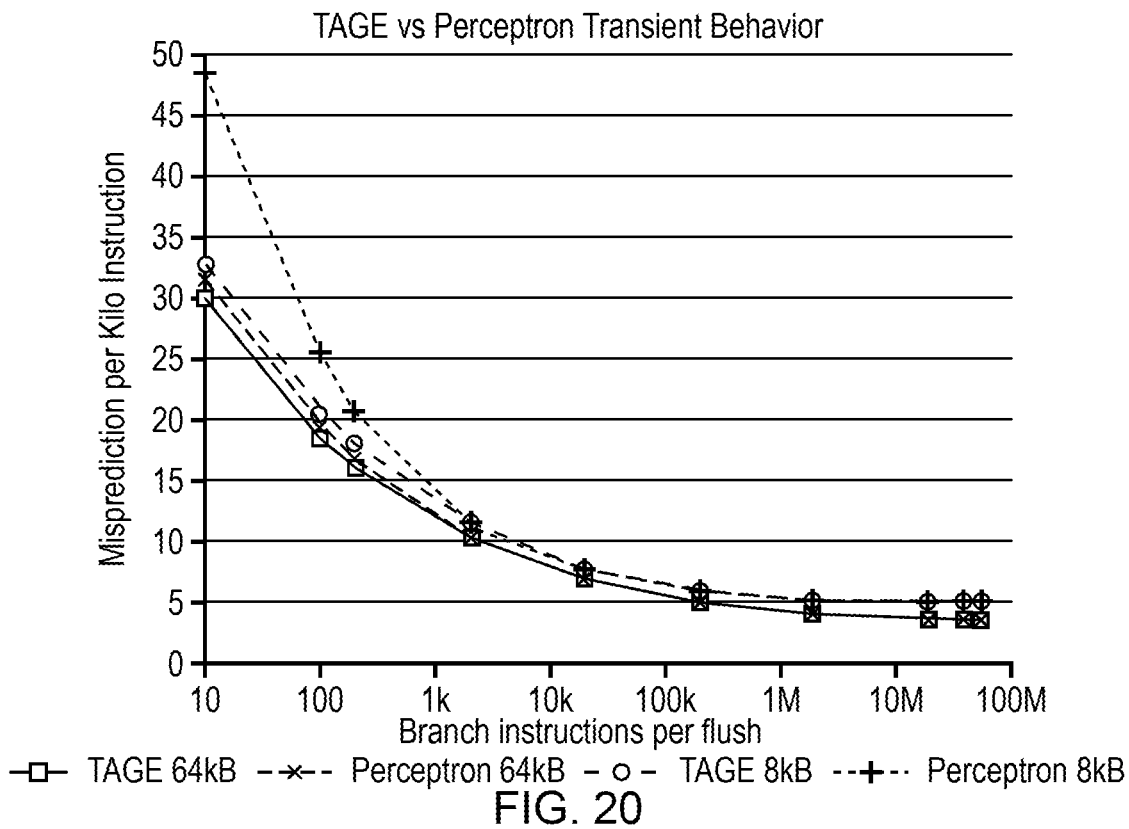
FIG. 20 is a graph providing a comparison between branch misprediction rate for TAGE and perceptron predictors.

Our second set of results focuses on comparing the transient behaviour of the two most prominent designs in modern systems; TAGE and Perceptron. FIG. 20 shows the different transient behaviour between TAGE and Perceptron designs. We notice that the 8 kB variant of Perceptron has the worst cold start, however it manages to rapidly improve and assume similar steady-state performance.

The transient MPKI for a flushing period of 20 k branch instructions is 7.75 and 6.98 for the 8 kB and 64 kB TAGE designs, and 7.57 and 6.93 respectively for Perceptron. Switching every 20 k branch instructions is within a realistic range for applications like the ones presented in Table I and for proposed systems supporting fine-grained migrations or frequent context switches. This result shows that TAGE can deliver better steady-state performance. However, for applications that perform frequent context switching, Perceptron delivers more accurate predictions.

Another observation can be extracted when comparing the 64 kB variants with the 8 kB ones at smaller windows of uninterrupted execution. Considering for instance, switching every 20 k or 200 k branch instructions, the 8 kB predictors perform on average 10% and 15% worse than the 64 kB designs. However, the performance gap increases to 33% when observing the same designs at steady-state.

Using the steady-state performance as a baseline and comparing the transient accuracy, across all granularities as fine as 20 k branch instructions, we calculate how much worse the accuracy can be in context-switch-heavy workloads. From FIG. 20, the MPKI increase is as much as 90% and 80% for TAGE and Perceptron respectively. This reinforces our belief that predictors today are evaluated without taking into account disruptions that occur during realistic execution.

C. ParTAGE

To improve on transient accuracy of branch prediction, we present the results from our proposal, ParTAGE a design that is influenced from both Perceptron and TAGE. Before we analyse its performance compared to the competitive designs today, we motivate its design choices.

Figure 21:
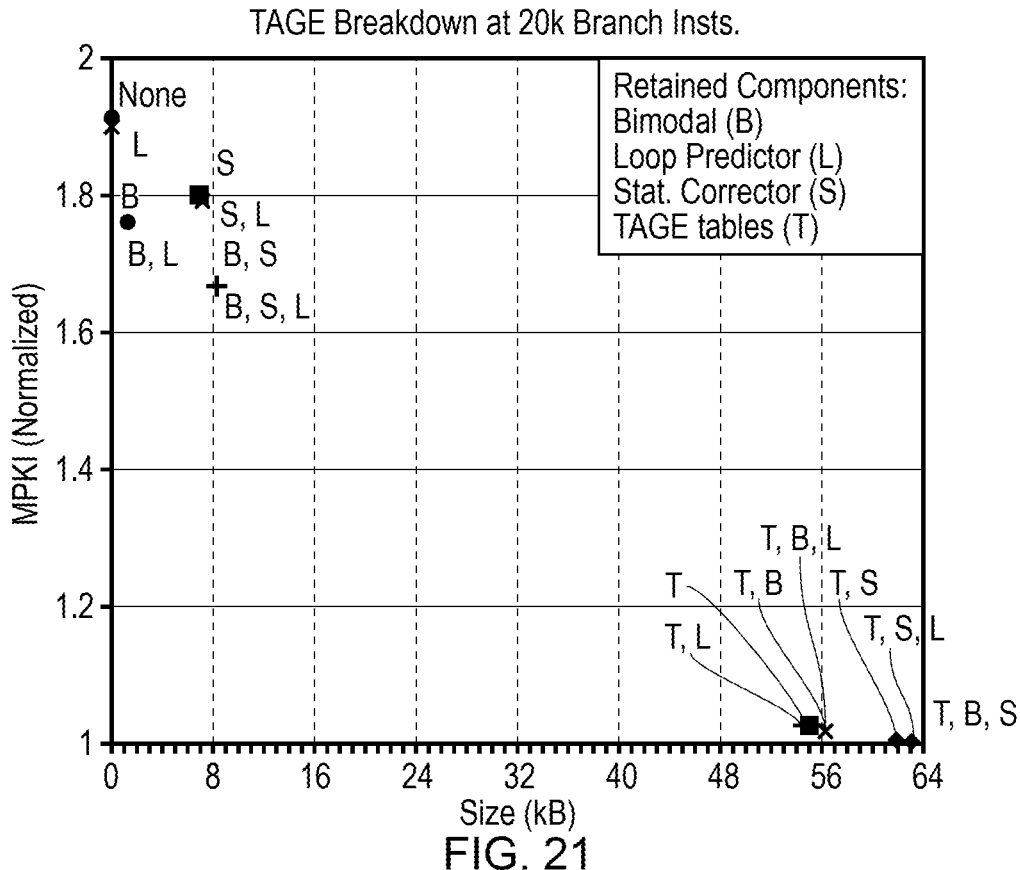
FIG. 21 is a graph illustrating results of an investigation of the effects on branch misprediction rate when saving different subsets of branch prediction state.

Dissecting TAGE:

We analyse the performance of TAGE by measuring the reduction to the overall transient MPKI caused by each component, when preserving its state between flushes. In FIG. 21 we track the size needed to retain the components in each configuration and the relative MPKI, normalized to the steady-state performance of TAGE. The analysis in the figure shows the transient state when at a flushing period of 20 k branch instructions. For instance, it shows that, for this granularity, retaining none of the components increases the MPKI by 90%.

From the figure, we make two additional observations. First, the majority of the performance is delivered by the TAGE tables, which are too large to preserve, especially when considering the flushing frequency being set to 20 k branches. Secondly, we notice that on the other side of the spectrum, the bimodal base predictor and the statistical corrector improve the MPKI by 16% and 10% respectively. However, as bimodal needs only 1.25 kB of state to be preserved, compared to the 8 kB of the statistical corrector, its MPKI improvement per kB value is much higher than that of the statistical corrector.

Finding the Right, "Small" Predictor:

The TAGE breakdown analysis leads to the underlying idea for ParTAGE. This idea is to design a predictor with a small enough base component to be preserved when context switching or migrating, but at the same time accurate enough to justify the added overhead of storing the state. From FIG. 20 we observed that Perceptron predictors rapidly improve their MPKI over time before reaching steady-state accuracy. This reveals an interesting insight about Multiperspective Perceptron predictors. Compared to bimodal predictors, the hashed and common weight values in modern Perceptron designs are a more effective design, being able to aggressively train and store information in a denser format. We focus on the latter attribute, that of dense branch information storage, to design the base predictor as we intend to store and restore it for each context, thus never letting it return to its transient accuracy.

Figure 22:
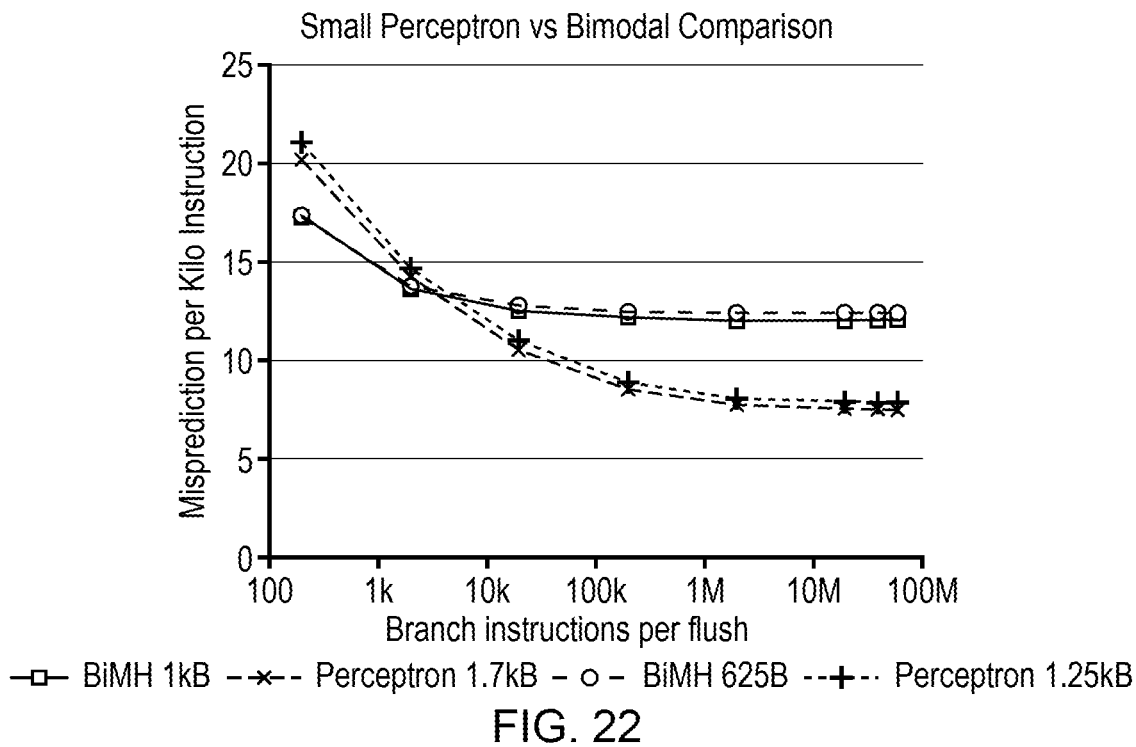
FIG. 22 is a graph comparing bimodal and perceptron designs.

In FIG. 22 we compare bimodal and Perceptron designs with sizes that will fit roughly within 1.25 kB of budget. Results show that while Perceptron has higher MPKI at granularities as fine as 200 branch instructions, its steady-state accuracy is significantly better.

Improving the Small Perceptron:

We choose to use a small Perceptron as the base predictor for ParTAGE. To reduce the size of the Perceptron predictor to 1.25 kB and achieve better accuracy, we calibrate the amount of feature tables and size of the Perceptron predictor we use. We fix the size of the predictor initially to 1.25 kB (part (a) of FIG. 23). We find that eight feature tables deliver the best performance.

Figure 23:
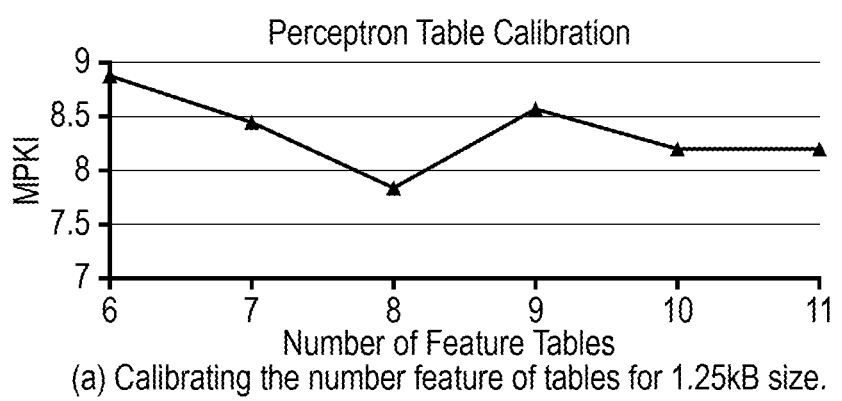
FIG. 23 illustrates the effect on branch misprediction rate when varying the size and number of feature tables of the perceptron predictor.
Figure 23:
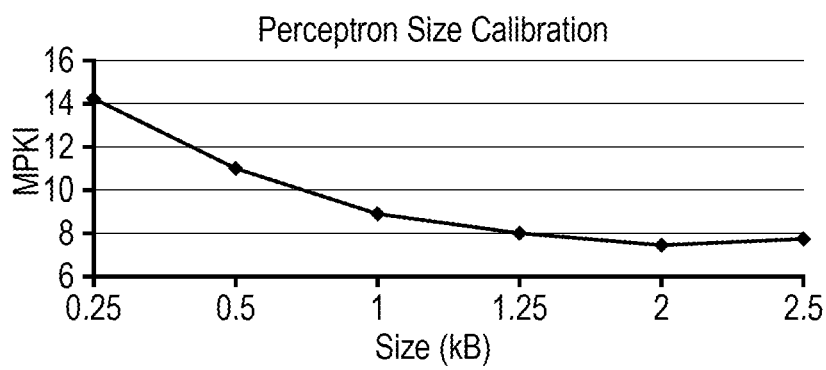

We then fix the feature tables to eight and perform a size sweep to further optimise the design, from 0.25 kB to 2.5 kB. Part (b) of FIG. 23 shows that 1.25 kB is close to the best configuration. We note that changing the feature sizes affects the prediction more than the altering the size does. We find that for completeness, a genetic algorithm as proposed in the Multiperspective Perceptron, might deliver even better results. We leave such optimisations of the final performance for the future.

D. ParTAGE Results

We create the ParTAGE predictor based on our observations for small predictors replacing the 1.25 kB bimodal with a perceptron of the same size.

Figure 24:
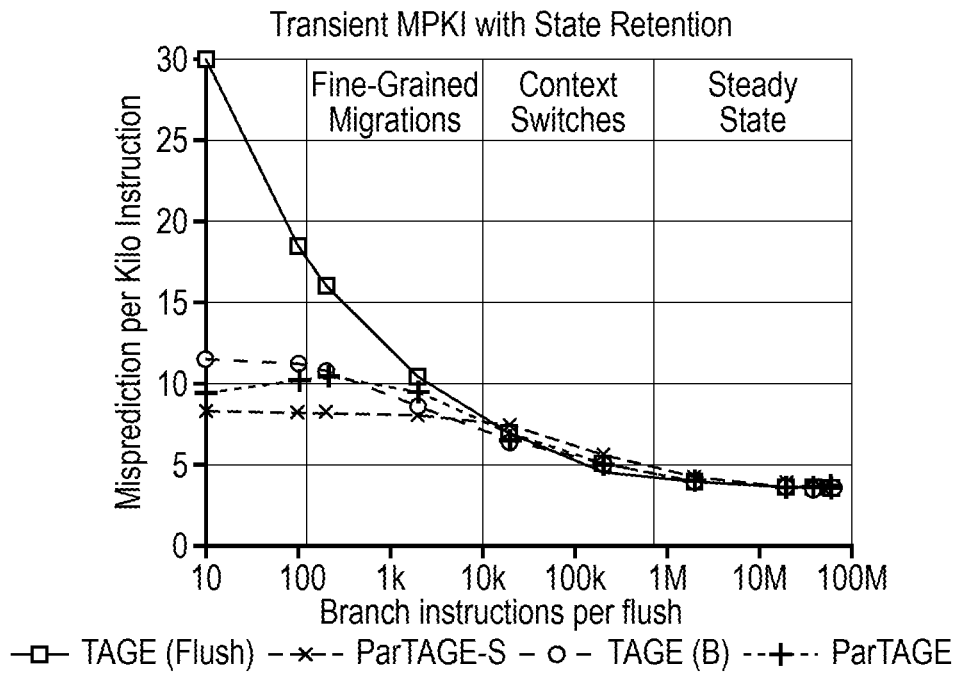
FIGS. 24 and 25 are graphs illustrating the effects on branch misprediction rate when a maximum of 1.25 kilobytes of branch predictor state is retained following a context switch.

Comparing ParTAGE Variants:

The results in FIG. 24 compare ParTAGE to a TAGE design that loses the entire state and TAGE (B) that keeps the bimodal state intact across flushes. For ParTAGE, we compare the two variants that alter the component selection policy. ParTAGE-S statically overrides the TAGE components for a brief period after a flush is performed, forcing the predictor to select the Perceptron prediction. ParTAGE uses the Perceptron confidence levels of each prediction to decide which prediction is better suited.

Overall, preserving a minimal state can have a significant improvement when the state is frequently flushed but has negligible effect at the steady-state MPKI. This shows that for systems with infrequent context switching, flushing the branch predictor state, to improve security for instance, does not have a negative effect on performance.

Figure 25:
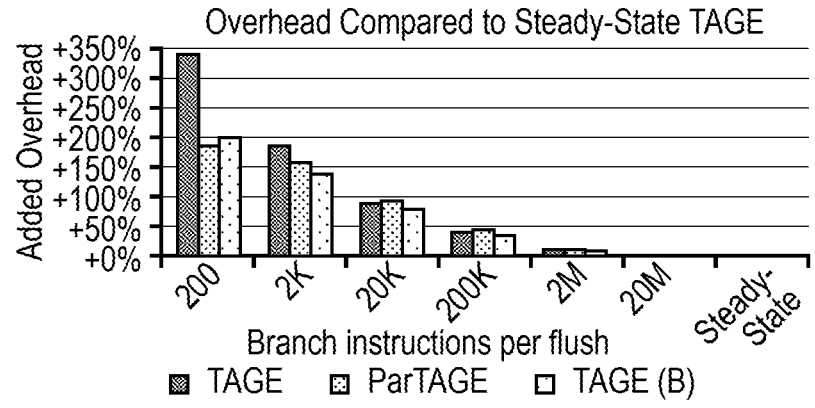

On the other hand, for systems that migrate as fast as every 1 k instructions, our design can halve the misprediction rate. This can be seen when the flushing period is 200 branch instructions, in FIG. 24. When considering current systems with fast context switching, we see that the best performance is delivered by our proposed extension to the original TAGE design that retains its bimodal state in the BSB. FIG. 25 shows the improvement is roughly 15%.

Comparing ParTAGE to TAGE and Perceptron:

Comparing the different implementations of ParTAGE, we notice that while ParTAGE-S works well for the fine grain switches, the transient accuracy suffers at larger flushing periods, as the TAGE tables have not been trained adequately. To contrast, ParTAGE, which simply feeds the confidence into TAGE, does not achieve the same transient accuracy when the period is below 2 k branch instructions. This happens in the case where the TAGE tables are completely cold, but their prediction is prioritized over the more accurate one from the perceptron component. This is also the reason ParTage does not improve the transient accuracy at 20 k branch instructions. This could be solved with better tuning of the selection policy in the future.

Improving the steady-state performance of the base predictor and retaining its state effectively enables efficient operation at finer granularities. This can be done by either increasing the size of the Branch State Buffer to fit more state, or develop 1 kB predictors with better steady-state accuracy. For instance, reaching the equivalent performance of an 8 kB perceptron can further reduce the added mispredictions.

Figure 26:
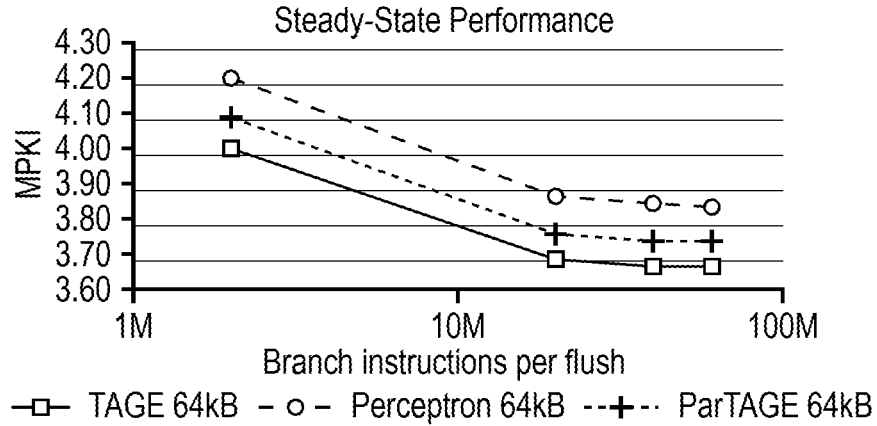
FIG. 26 compares steady state branch misprediction rate for different forms of branch predictor.

While the improvement of the transient accuracy of branch prediction is targeted, it is equally important to maintain a competitive steady-state accuracy for our proposed design. We perform a direct comparison between TAGE-SC-L, both Multiperspective Perceptron versions submitted to CBP5 and the best version of ParTAGE. FIG. 26 provides a detailed look at the steady-state MPKI compared to TAGE and the best version of the Multiperspective Perceptron. We observe that ParTAGE delivers 3.726 MPKI, competitive to TAGE (3.660 MPKI) and even outperforming perceptron (3.826 MPKI).

VII. CONCLUDING REMARKS

In this work, we have focused on effects which are disruptive to branch predictor performance. We highlight realistic cases that cause this, such as frequent context switches or migrations but also mitigation techniques for side-channel attacks that target the speculation engine. We show that these disruptions create a disconnect between the reported nominal performance of branch predictors and the actual accuracy in a real world applications. To distinguish between the two, we introduce the notions of steady-state and transient branch predictor performance.

We propose a novel mechanism, the Branch State Buffer, that retains a minimal, isolated state per context to reduce the high number of mispredictions. We propose two designs that store essential context state in the BSB, First an extension to TAGE, named TAGE (B), that keeps the state of its bimodal predictor. Second, a new branch predictor design, ParTAGE, replacing the bimodal in TAGE with a Perceptron. We evaluate using a new methodology, which modifies the framework used in the Championship Branch Prediction to be able to clear branch predictor state across different frequencies.

We show that branch predictors today can have as much as 90% more mispredictions than expected at steady-state, when operating under certain realistic conditions. Using TAGE (B) we manage to obtain a reduction of 15% on MPKI. Additionally, we show that, using ParTAGE, fine-grained migrations in heterogeneous systems, can become much more efficient, as our design halves the misprediction rate. We achieve all this ensuring that contexts remain isolated and protected from side channel attacks and maintain steady-state performance on par with current competitive designs.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A TAGE branch predictor for predicting a branch instruction outcome, comprising:
a plurality of TAGE prediction tables to provide a TAGE prediction for the branch instruction outcome, each TAGE prediction table comprising a plurality of prediction entries trained based on previous branch instruction outcomes;
lookup circuitry to lookup each of the TAGE prediction tables based on an index determined as a function of a target instruction address and a portion of previous execution history indicative of execution behaviour preceding an instruction at the target instruction address, said portion of the previous execution history used to determine the index having different lengths for different TAGE prediction tables; and
a fallback predictor to provide a fallback prediction for the branch instruction outcome in case the lookup misses in all of the TAGE prediction tables; in which:
the fallback predictor comprises a perceptron predictor comprising at least one weight table to store weights trained based on previous branch instruction outcomes, and to predict the branch instruction outcome based on a sum of terms, each term depending on a respective weight selected from said at least one weight table based on a respective portion of at least one of the target instruction address and the previous branch history; and
a total size of branch prediction state stored by the perceptron predictor is smaller than a total size of branch prediction state stored by the plurality of TAGE prediction tables.

2. The TAGE branch predictor of claim 1, comprising a selection circuitry to select between the fallback prediction provided by the fallback predictor and the TAGE prediction provided by the plurality of TAGE prediction tables, depending on a confidence value indicative of a level of confidence in the TAGE prediction, said confidence value obtained from the TAGE prediction tables by the lookup circuitry during the lookup.

3. The TAGE branch predictor of claim 2, in which the selection circuitry is configured to select the fallback prediction when the lookup misses in all of the TAGE prediction tables or the confidence value indicates a level of confidence less than a threshold.

4. The TAGE branch predictor of claim 1, in which when the lookup hits in at least one TAGE prediction table, the TAGE prediction comprises a prediction based on an indexed entry of a selected TAGE prediction table, the selected TAGE prediction table comprising the one of said at least one TAGE prediction table for which the index is determined based on the longest portion of the previous execution history.

5. The TAGE branch predictor of claim 1, comprising control circuitry responsive to an execution context switch of a processing element from a first execution context to a second execution context, to prevent the TAGE branch predictor providing a branch prediction for an instruction of the second execution context based on branch prediction state trained based on instructions of the first execution context.

6. The TAGE branch predictor of claim 1, comprising branch prediction save circuitry responsive to a branch prediction save event to save information to a branch state buffer depending on at least a portion of the at least one weight table of the perceptron predictor; and
branch prediction restore circuitry responsive to a branch prediction restore event associated with the given execution context to restore at least a portion of the at least one weight table of the perceptron predictor based on information previously stored to the branch state buffer.

7. The TAGE branch predictor of claim 6, comprising a selection circuitry to select between the fallback prediction provided by the fallback predictor and a TAGE prediction provided by the plurality of TAGE prediction tables, in which:
during an initial period following the branch prediction restore event, the selection circuitry is configured to select the fallback prediction provided by the fallback predictor.

8. The TAGE branch predictor of claim 7, in which during the initial period, the TAGE prediction tables are configured to update the prediction entries based on outcomes of branch instructions.

9. The TAGE branch predictor of claim 7, in which the initial period comprises one of:
a predetermined duration of time following the branch prediction restore event;
a predetermined number of processing cycles following the branch prediction restore event;
a predetermined number of instructions being processed following the branch prediction restore event;
a predetermined number of branch instructions being processed following the branch prediction restore event; or
a predetermined number of lookups being made by the lookup circuitry following the branch prediction restore event.

10. The TAGE branch predictor of claim 7, in which the initial period comprises a period lasting until a level of confidence in the TAGE prediction exceeds a predetermined level.

11. An apparatus comprising:
a first processing element to process instructions in at least one execution context; and
the TAGE branch predictor of claim 1, to predict outcomes of branch instructions processed by the first processing element.

12. The apparatus of claim 11, comprising a second processing element comprising a second branch predictor to predict outcomes of branch instructions processed by the second processing element.

13. The apparatus of claim 12, in which the second branch predictor comprises a perceptron predictor corresponding to the fallback predictor of the TAGE branch predictor.

14. The apparatus of claim 13, comprising branch prediction state transfer circuitry responsive to migration of an execution context from the second processing element to the first processing element to:
transfer the at least one weight table from the second branch predictor to the fallback predictor of the first branch predictor, and
initialise the TAGE prediction tables of the first branch predictor to initial values independent of a state of the second branch predictor.

15. The apparatus of claim 14, comprising branch prediction state transfer circuitry responsive to migration of an execution context from the first processing element to the second processing element to:
transfer the at least one weight table from the fallback predictor of the TAGE branch predictor to the second branch predictor, and
invalidate or disable the TAGE prediction tables of the TAGE branch predictor.

16. A TAGE branch predictor for predicting a branch instruction outcome, comprising:
means for storing TAGE prediction tables to provide a TAGE prediction for the branch instruction outcome, each TAGE prediction table comprising a plurality of prediction entries trained based on previous branch instruction outcomes;
means for looking up each of the TAGE prediction tables based on an index determined as a function of a target instruction address and a portion of previous execution history indicative of execution behaviour preceding an instruction at the target instruction address, said portion of the previous execution history used to determine the index having different lengths for different TAGE prediction tables; and
means for providing a fallback prediction for the branch instruction outcome in case the lookup misses in all of the TAGE prediction tables; in which:
the means for providing a fallback prediction comprises means for providing a perceptron prediction, comprising means for storing weights trained based on previous branch instruction outcomes, and means for predicting the branch instruction outcome based on a sum of terms, each term depending on a respective weight selected from said at least one weight table based on a respective portion of at least one of the target instruction address and the previous branch history; and
a total size of branch prediction state stored by the means for providing a perceptron prediction is smaller than a total size of branch prediction state stored by the TAGE prediction tables.

17. A method for predicting a branch instruction outcome using a TAGE branch predictor comprising a plurality of TAGE prediction tables for providing a TAGE prediction for the branch instruction outcome, each TAGE prediction table comprising a plurality of prediction entries trained based on previous branch instruction outcomes; the method comprising:
looking up each of the TAGE prediction tables based on an index determined as a function of a target instruction address and a portion of previous execution history indicative of execution behaviour preceding an instruction at the target instruction address, said portion of the previous execution history used to determine the index having different lengths for different TAGE prediction tables; and providing a fallback prediction for the branch instruction outcome in case the lookup misses in all of the TAGE prediction tables, using a perceptron predictor comprising at least one weight table to store weights trained based on previous branch instruction outcomes, the fallback prediction being predicted based on a sum of terms, each term depending on a respective weight selected from said at least one weight table based on a respective portion of at least one of the target instruction address and the previous branch history; and a total size of branch prediction state stored by the perceptron predictor is smaller than a total size of branch prediction state stored by the plurality of TAGE prediction tables.

* * * * *